US010735272B1

(12) United States Patent
Saurabh

(10) Patent No.: US 10,735,272 B1
(45) Date of Patent: Aug. 4, 2020

(54) GRAPHICAL USER INTERFACE FOR SECURITY INTELLIGENCE AUTOMATION PLATFORM USING FLOWS

(71) Applicant: Logichub, Inc., Mountain View, CA (US)

(72) Inventor: Kumar Saurabh, Menlo Park, CA (US)

(73) Assignee: Logichub, Inc., Mountain View, CA (US)

( * ) Notice: Subject to any disclaimer, the term of this patent is extended or adjusted under 35 U.S.C. 154(b) by 193 days.

(21) Appl. No.: 15/836,592

(22) Filed: Dec. 8, 2017

(51) Int. Cl.
*H04L 29/06* (2006.01)
*H04L 12/24* (2006.01)
*G06F 3/0486* (2013.01)
*G06F 21/56* (2013.01)

(52) U.S. Cl.
CPC .......... *H04L 41/14* (2013.01); *G06F 3/0486* (2013.01); *G06F 21/566* (2013.01); *H04L 63/1416* (2013.01); *H04L 63/1425* (2013.01)

(58) Field of Classification Search
CPC . H04L 41/14; H04L 63/1416; H04L 63/1425; G06F 3/0486; G06F 21/566
See application file for complete search history.

(56) References Cited

U.S. PATENT DOCUMENTS

| 8,803,884 | B2 | 8/2014 | Bradshaw | |
|---|---|---|---|---|
| 9,596,207 | B1 | 3/2017 | Lin | |
| 9,626,629 | B2 | 4/2017 | Vijayaraghavan | |
| 9,654,485 | B1 | 5/2017 | Neumann | |
| 9,832,216 | B2 | 11/2017 | Kaloroumakis | |
| 10,193,901 | B2* | 1/2019 | Muddu | H04L 41/22 |
| 2008/0028470 | A1* | 1/2008 | Remington | G06F 21/33 726/25 |
| 2009/0228233 | A1 | 9/2009 | Anderson | |
| 2013/0055394 | A1* | 2/2013 | Beresnevichiene | G06F 21/577 726/24 |
| 2015/0058984 | A1 | 2/2015 | Shen | |
| 2015/0207809 | A1* | 7/2015 | Macaulay | G06F 21/552 726/22 |
| 2016/0021135 | A1* | 1/2016 | Chesla | H04L 63/02 726/23 |
| 2016/0164905 | A1* | 6/2016 | Pinney Wood | G06F 16/9024 726/25 |
| 2016/0301706 | A1 | 10/2016 | Katz | |
| 2017/0063902 | A1* | 3/2017 | Muddu | G06F 16/254 |

(Continued)

OTHER PUBLICATIONS

RSA, "Building an Intelligence-Driven Security OperationsCenter", RSA Techinical Brief, Published Jun. 2014, pp. 1-15 (Year: 2014).*

(Continued)

*Primary Examiner* — Chau Le
(74) *Attorney, Agent, or Firm* — Van Pelt, Yi & James LLP

(57) ABSTRACT

A system for security intelligence automation using flows is disclosed. In various embodiments, a system includes a processor configured to provide a graphical user interface for at least one visual flow for threat ranking. The processor is further configured to render, in the graphical user interface, a visual flow interface for at least one of generating and configuring the at least one visual flow. The processor is further configured to provide, via the visual flow interface, a drag and drop ranking automation flow.

22 Claims, 37 Drawing Sheets

(56) References Cited

U.S. PATENT DOCUMENTS

| | | |
|---|---|---|
| 2017/0085588 A1* | 3/2017 | Laidlaw ................ G06F 21/552 |
| 2018/0152475 A1 | 5/2018 | Park |
| 2018/0157831 A1* | 6/2018 | Abbaszadeh ......... G06F 21/552 |
| 2019/0044969 A1 | 2/2019 | Pilkington |
| 2019/0260804 A1* | 8/2019 | Beck ..................... G06F 3/0486 |
| 2019/0268354 A1 | 8/2019 | Zettel, II |

OTHER PUBLICATIONS

Vectra, "How to Automate Security Operations Centers with Artificial Intelligence", Vectra White Paper, Published Jun. 2017, pp. 1-10 (Year: 2017).*

* cited by examiner

200

100

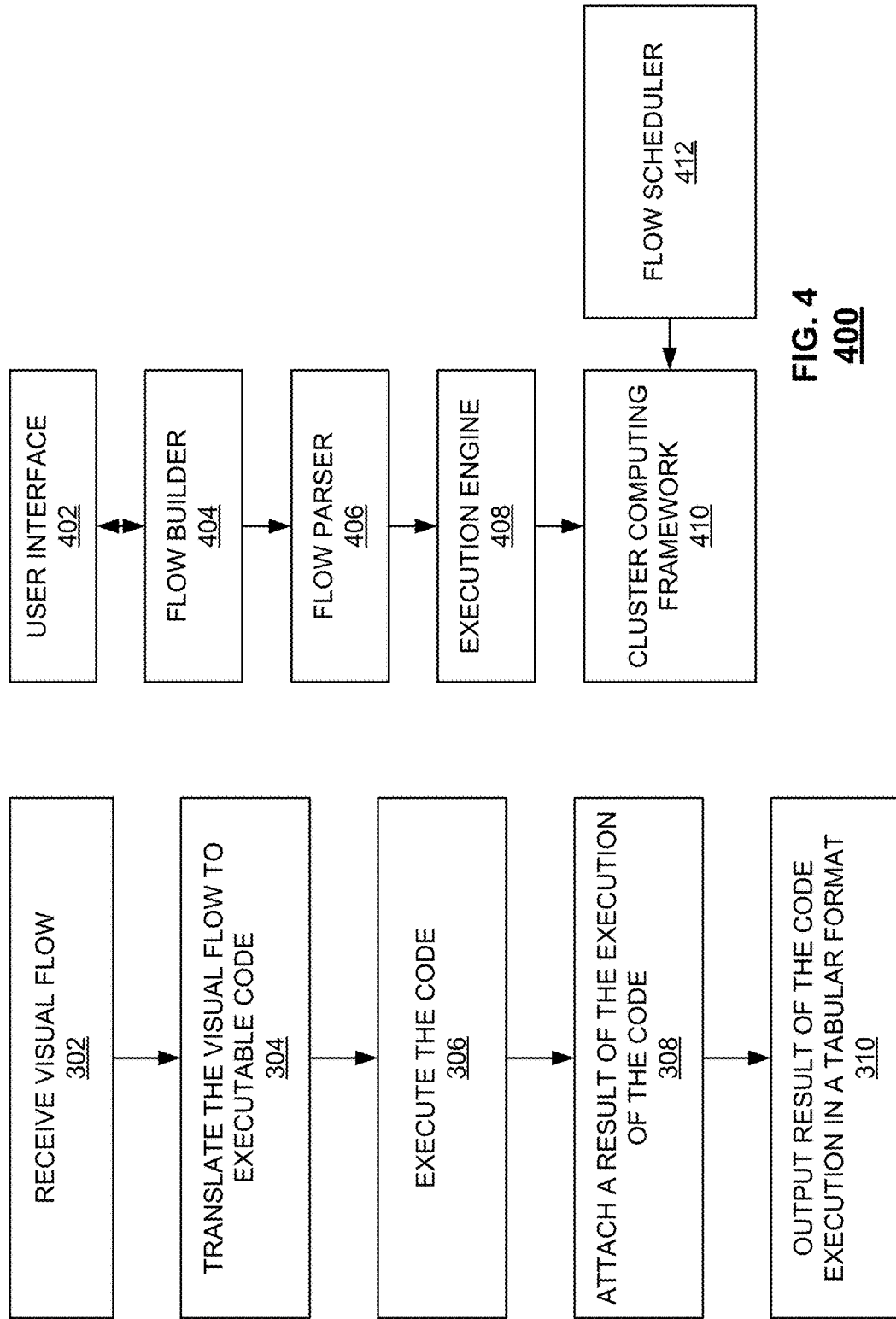

500

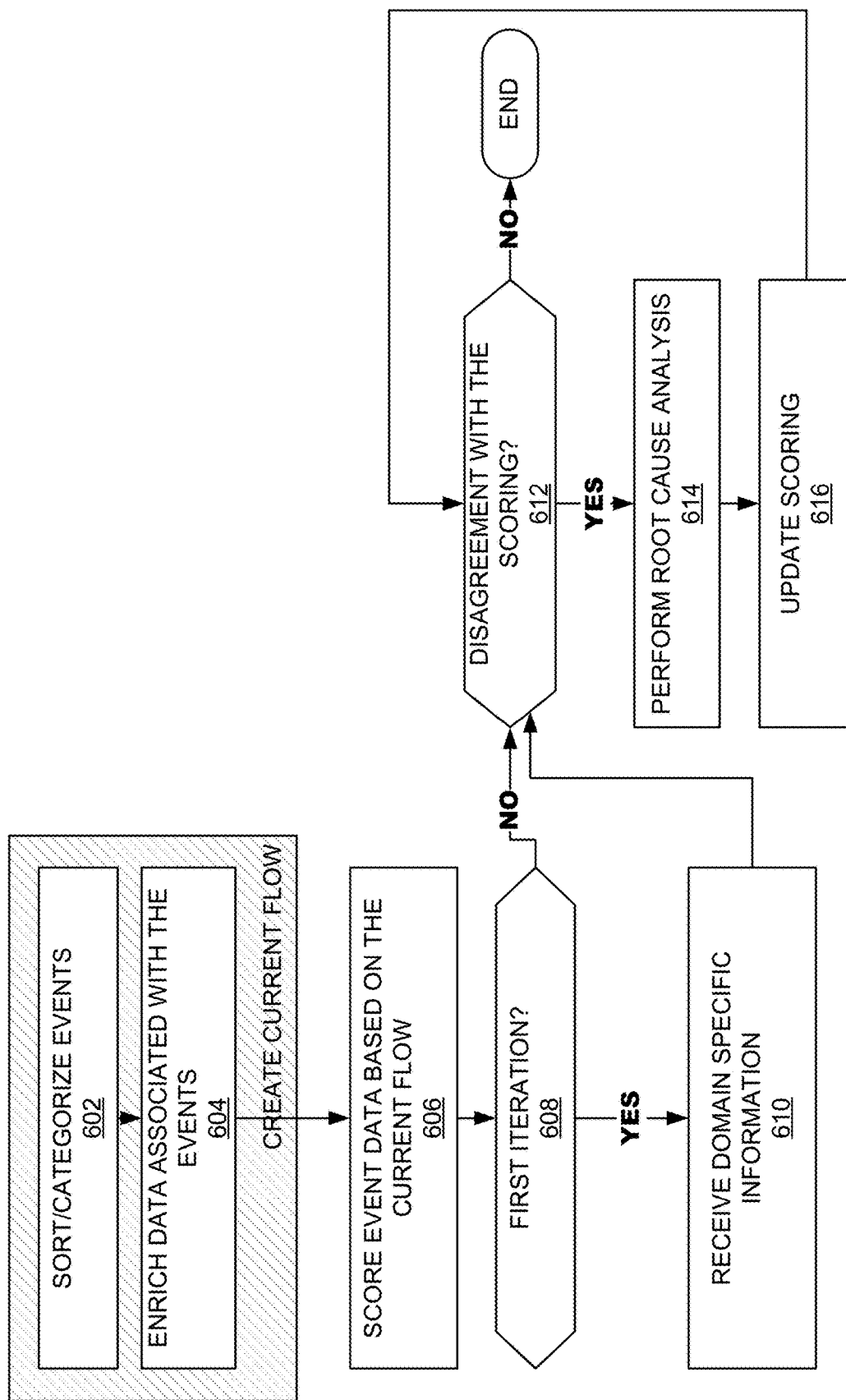

| USER | AUTHENTICATION | IP ADDRESS |
|---|---|---|
| JOE | ENTERPRISE ACCESS GATEWAY | 151.101.9.11 |
| SUZIE | ENTERPRISE ACCESS GATEWAY | 175.45.177.15 |
| CHUCK | ENTERPRISE ACCESS GATEWAY | 87.226.162.2 |
| BILL | ENTERPRISE ACCESS GATEWAY | 151.101.13.4 |
| TOM | ENTERPRISE ACCESS GATEWAY | 151.101.9.11 |

FIG. 7A
700

| USER | AUTHENTICATION | IP ADDRESS | DEPT. | ACCESS COUNTRY |
|---|---|---|---|---|
| JOE | ENTERPRISE ACCESS GATEWAY | 151.101.9.11 | DEV | US |
| SUZIE | ENTERPRISE ACCESS GATEWAY | 175.45.177.15 | FINANCE | KP |
| CHUCK | ENTERPRISE ACCESS GATEWAY | 87.226.162.2 | FINANCE | RU |
| BILL | ENTERPRISE ACCESS GATEWAY | 151.101.13.4 | DEV | US |
| TOM | ENTERPRISE ACCESS GATEWAY | 151.101.9.11 | DEV | US |

FIG. 7B
750

| USER | AUTHENTICATION | IP ADDRESS | DEPT | ACCESS COUNTRY | SCORE |
|---|---|---|---|---|---|
| JOE | ENTERPRISE ACCESS GATEWAY | 151.101.9.11 | DEV | US | 0 |
| SUZIE | ENTERPRISE ACCESS GATEWAY | 175.45.177.15 | FINANCE | KP | 8 |
| CHUCK | ENTERPRISE ACCESS GATEWAY | 87.226.162.2 | DEV | RU | 8 |
| BILL | ENTERPRISE ACCESS GATEWAY | 151.101.13.4 | DEV | US | 0 |
| TOM | ENTERPRISE ACCESS GATEWAY | 151.101.9.11 | FINANCE | US | 0 |

FIG. 7C
770

| USER | AUTHENTICATION | IP ADDRESS | DEPT | ACCESS COUNTRY | SCORE |
|---|---|---|---|---|---|
| JOE | ENTERPRISE ACCESS GATEWAY | 151.101.9.11 | DEV | US | 0 |
| SUZIE | ENTERPRISE ACCESS GATEWAY | 175.45.177.15 | FINANCE | KP | 10 |
| CHUCK | ENTERPRISE ACCESS GATEWAY | 87.226.162.2 | DEV | RU | 1 |
| BILL | ENTERPRISE ACCESS GATEWAY | 151.101.13.4 | DEV | US | 0 |
| TOM | ENTERPRISE ACCESS GATEWAY | 151.101.9.11 | FINANCE | US | 0 |

| SOURCE | HOST | MESSAGE TIME | SIZE | RAW DATA |
|---|---|---|---|---|
| IT LOGS | SUMO CLOUD | 4/10/2017 16:27:17.000-0700 | 1074 KB | EVENT VERSION, USER IDENTITY, ASSUMED ROLE, PRINCIPAL ID, ATTRIBUTES, MFAAUTHENTICATED, CREATION DATE, SESSION ISSUER, ROLE, EVENT TIME, SOURCEIPADDR, USER AGENT, REQUEST PARAMS, RECIPIENTACCOUNTID,... |
| DMZ LOGS | SUMO CLOUD | 4/10/2017 16:27:17.000-0700 | 1062 KB | EVENT VERSION, USER IDENTITY, ASSUMED ROLE, PRINCIPAL ID, ATTRIBUTES, MFAAUTHENTICATED, CREATION DATE, SESSION ISSUER, ROLE, EVENT TIME, SOURCEIPADDR, USER AGENT, REQUEST PARAMS, RECIPIENTACCOUNTID,... |
| DMZ LOGS | SUMO CLOUD | 4/10/2017 16:26:58.000-0700 | 1062 KB | EVENT VERSION, USER IDENTITY, ASSUMED ROLE, PRINCIPAL ID, ATTRIBUTES, MFAAUTHENTICATED, CREATION DATE, SESSION ISSUER, ROLE, EVENT TIME, SOURCEIPADDR, USER AGENT, REQUEST PARAMS, RECIPIENTACCOUNTID,... |

FIG. 10A
1000

| _ihub_ts | sourcecategory | source | raw | sourcehost | messagetimems | sourcename | messagetime | size |
|---|---|---|---|---|---|---|---|---|
| @Day0<br>All Events ▼<br>14:45 - 15:15 05/11/2017 | cloudtrail_it_logs | cloudtrail_it_logs | {"eventVersion":"1.05","userIdentity":<br>{"type":"AssumedRole","principalId":"AROAIBZ3I4CYJMSGZLWCK:i8083535380","arn":"a<br>rn:aws:sts::616686154622:assumed-<br>role/DomeSecurityManagement/i8083535380","accountId":"616686154622","accessKe<br>yId":"ASIAJVMJPKNVA7B5FGSQ","sessionContext":{"attributes":<br>{"mfaAuthenticated":"false","creationDate":"2017-04-10T23:23:01Z"},"sessionIssuer":<br>{"type":"Role","principalId":"AROAIBZ3I4CYJMSGZLWCK","accountId":"616686815<br>4622","arn":"arn:aws:iam::616686154622","userName":"Dom<br>eSecurityManagement"}}},"eventTime":"2017-04-<br>10T23:27:17Z","eventSource":"cloudtrail.amazonaws.com","eventName":"DescribeTrails"<br>,"awsRegion":"us-east-1","sourceIPAddress":"54.91.115.185","userAgent":"aws-sdk-<br>dotnet/4.5.13.1.2 aws-sdk-dotnet-core/3.3.9.0 .NET_Runtime/4.0 .NET_Framework/4.0<br>OS/Microsoft_Windows_NT_6.2.9200.0<br>ClientSync","requestParameters":null,"responseElements":null,"requestID":"3c4f0621-<br>1eb5-11e7-b7f2-d7f6c3e3c3d1","eventID":"8c63fb69-e6ea-496e-bd76-<br>5e9b67976c5e","eventType":"AwsApiCall","recipientAccountId":"616686154622"} | Sumo<br>Cloud | 1491866637000 | /AWSLogs/616686154622/CloudTrail/us-east-<br>1/2017/04/10/616686154622_CloudTrail_us-east-<br>1_20170410T23230Z_xppuhngpMwfEdYiEH.json.gz | 04/10/2017<br>16:27:17.000<br>-0700 | 107 |
| _ihub_ts | sourcecategory<br>cloudtrail_dmz_logs | source<br>cloudtrail_dmz_logs | raw<br>{"eventVersion":"1.04","userIdentity":<br>{"type":"AssumedRole","principalId":"AROAJN6IVPWEFR5V3FOQ:1412957852","arn":"<br>arn:aws:sts::434389943584839:assumed-<br>role/DomeSecurityManagement/1412957852","accountId":"434389943584839","sessi<br>onContext":{"attributes":{"mfaAuthenticated":"false","creationDate":"2017-04- | sourcehost<br>Sumo<br>Cloud | messagetimems<br>1491866620000 | sourcename<br>dmz/AWSLogs/434389943584839/CloudTrails-<br>west-<br>2/2017/04/10/434389943584839_CloudTrail_us-<br>west-<br>2_20170410T23230Z_8y5A1qofcxywtmXP.json.gz | messagetime<br>04/10/2017<br>16:27:00.000<br>-0700 | size<br>106 |

| Data Time Range | 05/11/2017 12:05:00 | to ∨ | 05/11/2017 12:10:00 | 🔍 |
|---|---|---|---|---|

| ⊕ Output | ⊖ | + Scores Rules ∨ | + Actions ∨ |
|---|---|---|---|

| | | ▽ | Filter Table |
|---|---|---|---|
| awsARN<br>arn:aws:iam::415674839002:user/kumar | eventName<br>GetBucketLocation | userAgent<br>[ElasticWolf/5.1.6] | count(1)<br>1 |
| awsARN<br>arn:aws:iam::434389943584839:root | eventName<br>GetBucketLocation | userAgent<br>support.amazonaws.com | count(1)<br>56 |
| awsARN<br>arn:aws:iam::434389943584839:root | eventName<br>GetBucketVersioning | userAgent<br>support.amazonaws.com | count(1)<br>1 |
| awsARN<br>arn:aws:iam::434389943584839:root | eventName<br>GetBucketLogging | userAgent<br>support.amazonaws.com | count(1)<br>1 |
| awsARN<br>arn:aws:iam::434389943584839:root | eventName<br>DescribeTrails | userAgent<br>support.amazonaws.com | count(1)<br>14 |
| awsARN<br>arn:aws:iam::434389943584839:root | eventName<br>GetTrailStatus | userAgent<br>support.amazonaws.com | count(1)<br>14 |
| awsARN<br>arn:aws:iam::434389943584839:root | eventName<br>GetBucketAcl | userAgent<br>support.amazonaws.com | count(1)<br>2 |

1 of 1 (7 events)

@ Create Stream

FIG. 13 (Cont.)

| Data Time Range | 05/11/2017 12:05:00 | to ∨ | 05/11/2017 12:10:00 | 🔍 |
|---|---|---|---|---|
| ⊞ Output ⊙ | + Scores Rules ∨ | + Actions | | ∨ |

1488 ▽ Filter Table

| 1482 | 1484 | 1486 | | |
|---|---|---|---|---|
| IssueruserName<br>Dome9SecurityManagement | eventName<br>DescribeTrails | userAgent<br>aws-sdk-dotnet-45/3.3.1.2 aws-sdk-dotnet-core/3.3.8.0 .NET_Runtime/4.0<br>.NET_Framework/4.0 OS/Microsoft_Windows_NT_6.2.9200.0 ClientSync | | count(1)<br>2737 |
| IssueruserName<br>Dome9SecurityManagement | eventName<br>GetBucketPolicy | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | | count(1)<br>144 |
| IssueruserName<br>Dome9SecurityManagement | eventName<br>GetBucketLogging | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | | count(1)<br>144 |
| IssueruserName<br>CloudHealthCostManagement | eventName<br>GetBucketTagging | userAgent<br>[aws-sdk-ruby2/2.7.16 jruby/1.9.3 java cloudhealth] | | count(1)<br>192 |
| IssueruserName<br>Dome9SecurityManagement | eventName<br>GetTrailStatus | userAgent<br>aws-sdk-dotnet-45/3.3.1.2 aws-sdk-dotnet-core/3.3.8.0 .NET_Runtime/4.0<br>.NET_Framework/4.0 OS/Microsoft_Windows_NT_6.2.9200.0 ClientSync | | count(1)<br>649 |
| IssueruserName<br>Dome9SecurityManagement | eventName<br>GetBucketTagging | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | | count(1)<br>119 |
| IssueruserName<br>Dome9SecurityManagement | eventName<br>GetBucketAcl | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | | count(1)<br>144 |
| IssueruserName<br>CloudHealthCostManagement | eventName<br>DescribeTrails | userAgent<br>aws-sdk-ruby2/2.7.16 jruby/1.9.3 java cloudhealth | | count(1)<br>19 |

1 of 1 (8 events)    @ Create Stream

| Data Time Range | 05/11/2017 12:05:00 | to ∨ | 05/11/2017 12:10:00 | 🔍 |
|---|---|---|---|---|
| ± Output ⊙ | + Scores Rules ∨ | + Actions | | ∨ |
| | | | ▽ | Filter Table |

| | | | |
|---|---|---|---|
| IssueruserName<br>Dome9SecurityManagement | eventName<br>DescribeTrails | userAgent<br>aws-sdk-dotnet-45/3.3.1.2 aws-sdk-dotnet-core/3.3.8.0 .NET_Runtime/4.0<br>.NET_Framework/4.0 OS/Microsoft_Windows_NT_6.2.9200.0 ClientSync | count(1)<br>2737 |
| IssueruserName<br>Dome9SecurityManagement | eventName<br>GetBucketPolicy | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | count(1)<br>144 |
| IssueruserName<br>Dome9SecurityManagement | eventName<br>GetBucketLogging | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | count(1)<br>144 |
| IssueruserName<br>CloudHealthCostManagement | eventName<br>GetBucketTagging | userAgent<br>[aws-sdk-ruby/1.16 jruby/1.9.3 java cloudhealth] | count(1)<br>192 |
| IssueruserName<br>Dome9SecurityManagement | eventName<br>GetTrailStatus | userAgent<br>aws-sdk-dotnet-45/3.3.1.2 aws-sdk-dotnet-core/3.3.8.0 .NET_Runtime/4.0<br>.NET_Framework/4.0 OS/Microsoft_Windows_NT_6.2.9200.0 ClientSync | count(1)<br>649 |
| IssueruserName<br>Dome9SecurityManagement | eventName<br>GetBucketTagging | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | count(1)<br>119 |
| IssueruserName<br>Dome9SecurityManagement | eventName<br>GetBucketAcl | userAgent<br>[aws-sdk-dotnet-45/3.3.5.1 aws-sdk-dotnet-core/3.3.8.0 .NET_Runtime/4.0<br>.NET_Framework/4.0 OS/Microsoft_Windows_NT_6.2.9200.0 ClientSync] | count(1)<br>144 |
| IssueruserName<br>CloudHealthCostManagement | eventName<br>DescribeTrails | userAgent<br>aws-sdk-ruby2/2.7.16 jruby/1.9.3 java cloudhealth | count(1)<br>19 |

1 of 1 (8 events)     @ Create Stream

FIG. 15 (Cont.)

| HUB SCORE | RAW DATA |
|---|---|
| 7.0 | EVENT VERSION, USER IDENTITY, ACCOUNTID, ACCESSKEYID, USER NAME, EVENT TIME, RECIPIENTACCOUNTID... |
| 0.0 | EVENT VERSION, USER IDENTITY, ACCOUNTID, ACCESSKEYID, USER NAME, EVENT TIME, RECIPIENTACCOUNTID... |
| 0.0 | EVENT VERSION, USER IDENTITY, ACCOUNTID, ACCESSKEYID, USER NAME, EVENT TIME, RECIPIENTACCOUNTID... |
| 0.0 | EVENT VERSION, USER IDENTITY, ACCOUNTID, ACCESSKEYID, USER NAME, EVENT TIME, RECIPIENTACCOUNTID... |
| 0.0 | EVENT VERSION, USER IDENTITY, ACCOUNTID, ACCESSKEYID, USER NAME, EVENT TIME, RECIPIENTACCOUNTID... |
| 0.0 | EVENT VERSION, USER IDENTITY, ACCOUNTID, ACCESSKEYID, USER NAME, EVENT TIME, RECIPIENTACCOUNTID... |

| FLOW 1 | 14:45 - 15:15 - 05/11/2017 |
|---|---|
| All Events ▼ | |
| lhub_ts | lhub score | _raw |
| | 7.0 | {"eventVersion":"1.04","userIdentity":{"type":"IAMUser","principalId":"BBDDFYKMGNWMQSP","arn":"arn:aws:iam::415674839002:user/kumar","accountId":"415674839002","accessKeyId":"AKIFDF563KKL342","userName":"kumar"},"eventTime":"2017-04-10T22:58:39Z","eventSource":"s3.amazonaws.com","eventName":"GetBucketLocation","awsRegion":"us-west-2","sourceIPAddress":"106.7.89.43","userAgent":"[ElasticMolf/5.1.6]","requestParameters":{"bucketName":"logichub-cloudtrail","location":""},"responseElements":null,"requestID":"EB47790621761117A","eventID":"ef634fe5-7f86-4a4c-9716-e307bf7ad4d6","eventType":"AwsApiCall","recipientAccountId":"415674839002"} |
| | 0.0 | {"eventVersion":"1.05","userIdentity":{"type":"AssumedRole","principalId":"AROAIBZ314CYJMSGZLWCK:1808353580","arn":"arn:aws:sts::616686154622:assumed-role/DomeSecurityManagement/1808353580","accountId":"616686154622","accessKeyId":"ASIAJVMJPKNVA75BFGSQ","sessionContext":{"attributes":{"mfaAuthenticated":"false","creationDate":"2017-04-10T23:23:01Z"},"sessionIssuer":{"type":"Role","principalId":"AROAIBZ314CYJMSGZLWCK","arn":"arn:aws:iam::616686154622:role/DomeSecurityManagement","accountId":"616686154622","userName":"Dome9SecurityManagement"}},"eventTime":"2017-04-10T23:27:17Z","eventSource":"cloudtrail.amazonaws.com","eventName":"DescribeTrails","awsRegion":"us-east-1","sourceIPAddress":"54.91.115.185","userAgent":"aws-sdk-dotnet-45/3.3.1.2 aws-sdk-dotnet-core/3.3.8.0 .NET_Runtime/4.0 .NET_Framework/4.0 OS/Microsoft_Windows_NT_6.2.9200.0 ClientSync","requestParameters":null,"responseElements":null,"requestID":"3c406821-1e45-11e7-b7f2-df7fe3e3c3d1","eventID":"8c53fb69-6eec-496e-bd76-5e9b67970e5e","eventType":"AwsApiCall","recipientAccountId":"616686154622"} |
| | 0.0 | {"eventVersion":"1.05","userIdentity":{"type":"AssumedRole","principalId":"AROAIXJ2QFVACXMSLDDO:1546770225","arn":"arn:aws:sts::415674839002:assumed-role/DomeSecurityManagement/1546770225","accountId":"415674839002","accessKeyId":"ASIAJ6HNJLWIMR7QRT6Q","sessionContext":{"attributes":{"mfaAuthenticated":"false","creationDate":"2017-04-10T23:11:46Z"},"sessionIssuer":{"type":"Role","principalId":"AROAIXJ2QFVACXMSLDDO","arn":"arn:aws:iam::415674839002:role/DomeSecurityManagement","accountId":"415674839002","userName":"Dome9SecurityManagement"}},"eventTime":"2017-04-10T23:11:46Z","eventSource":"cloudtrail.amazonaws.com","eventName":"DescribeTrails","awsRegion":"us-west-2","sourceIPAddress":"34.91.115.185","userAgent":"aws-sdk-dotnet-45/3.3.1.2 aws-sdk-dotnet-core/3.3.8.0 .NET_Runtime/4.0 .NET_Framework/4.0 OS/Microsoft_Windows_NT_6.2.9200.0 ClientSync","requestParameters":null,"responseElements":null,"requestID":"1e43-11e7-a648-c33f147c287c","eventID":"83fd5994-4664-44c9-806b-70d12bcfa862","eventType":"AwsApiCall","recipientAccountId":"415674839002"} |

| Data Time Range | 05/11/2017 14:45:00 | to ∨ | 05/11/2017 15:15:00 | 🔑 |
|---|---|---|---|---|
| | ± Output ⊕ | + Scores Rules ∨ | + Actions ∨ | |
| | | | ▽ Filter Table | |
| awsARN<br>arn:aws:sts::434389943584839:assumed-role/XASAMLAdministrator/tina | userAgent<br>[S3Console/0.4] | eventName<br>GetBucketLocation | IssueruserName<br>XASAMLAdministrator | count(1)<br>5 |
| awsARN<br>arn:aws:sts::434389943584839:assumed-role/XASAMLAdministrator/tina | userAgent<br>[S3Console/0.4] | eventName<br>CreateBucket | IssueruserName<br>XASAMLAdministrator | count(1)<br>1 |
| | | | 1 of 1 (2 events) | |
| | | | @ Create Stream | |

FIG. 21 (Cont.)

| Data Time Range | 05/11/2017 14:45:00 | to ∨ | 05/11/2017 15:15:00 | 🔍 |
|---|---|---|---|---|
| ⊕ Output ⟲ | + Scores Rules ∨ | + Actions | | ∨ |
| | | | ▽Filter Table | |
| awsARN<br>arn:aws:sts::434389943584839:assumed-<br>role/XASAMLAdministrator/tina | userAgent<br>[S3Console/0.4] | eventName<br>GetBucketLocation | IssueruserName<br>XASAMLAdministrator | count(1)<br>5 |
| awsARN<br>arn:aws:sts::434389943584839:assumed-<br>role/XASAMLAdministrator/tina | userAgent<br>[S3Console/0.4] | eventName<br>CreateBucket | IssueruserName<br>XASAMLAdministrator | count(1)<br>1 |

1 of 1 (2 events)

@ Create Stream

GRAPHICAL USER INTERFACE FOR SECURITY INTELLIGENCE AUTOMATION PLATFORM USING FLOWS

BACKGROUND OF THE INVENTION

Information security methodologies protect IT infrastructure by preventing unauthorized access and misuse of data. As cybercriminals become increasingly sophisticated, and vary their strategies of attack, information security processes need to evolve to accurately detect threats and prevent attacks. In addition, as computing systems become more complex and susceptible to attacks, it is more challenging to protect these systems from threats. Conventional monitoring techniques typically do not efficiently and accurately detect potential threats.

BRIEF DESCRIPTION OF THE DRAWINGS

Various embodiments of the invention are disclosed in the following detailed description and the accompanying drawings.

FIG. 3 is a flow chart illustrating an embodiment of a process for rendering a visual flow interface for security intelligence automation.

FIG. 4 is a block diagram illustrating an embodiment of a security intelligence automation platform.

FIG. 6 is a flow chart illustrating an embodiment of a process for threat detection.

FIG. 7A is a block diagram illustrating an embodiment of detecting threats in an account takeover situation.

FIG. 7B is a block diagram illustrating an embodiment of detecting threats in an account takeover situation.

FIG. 7C is a block diagram illustrating an embodiment of detecting threats in an account takeover situation.

FIG. 7D is a block diagram illustrating an embodiment of detecting threats in an account takeover situation.

FIG. 10A is an example of a GUI for security intelligence automation displaying raw data with an associated source and host.

FIG. 10B is an example of a GUI for security intelligence automation displaying raw data with an associated source and host.

FIG. 17A is an example of a GUI for security intelligence automation displaying raw data with an associated source and host.

FIG. 17B is an example of a GUI for security intelligence automation displaying raw data of a batch.

FIG. 18 is an example of a GUI for security intelligence automation displaying raw data with an associated source and host.

DETAILED DESCRIPTION

Figure 2:
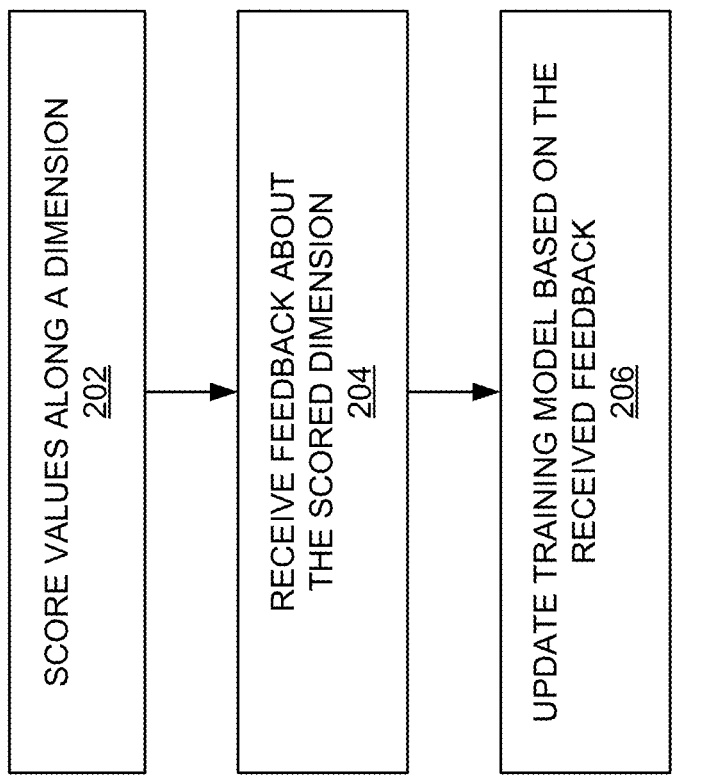
FIG. 2 is a flow chart illustrating an embodiment of a process for scoring based on feedback.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Information security for a system may be implemented by a human analyst in cooperation with a computer processor. For example, the processor performs threat detection by monitoring the system, and generates an alert when an anomaly is detected. The human analyst reviews the alerts (also called "alert triaging") to determine whether an alert indicates a true threat to the system or is merely a false alarm. A true threat to a system may be an intrusion or indication of an imminent attack on the system.

Threat detection is a process by an alert or event is classified as a threat. For example, a threat may be detected by examining a raw data set to discover anomalies or patterns within the data set. An alert may be generated when a threat is detected. For example, an alert is generated when collected data matches a rule condition. In some instances, techniques used for threat detection may result in under-identification of threats such as missing a breach (false negative) or over-identification of threats such as identifying a threat where there was no intrusion or risk of intrusion (false positive). Too many false negatives means that security breaches are missed and a system is more likely to be compromised. Too many false positives is noisy, overwhelming analysts who perform alert triaging.

Alert triaging is a process by which alerts are evaluated to determine whether a threat is real or merely a false alarm. Sometimes, alert triaging includes drawing a conclusion or rendering an opinion about the severity of a threat. A rule used for alert triaging may be written based on known attack patterns or threats. A rule is more effective if it is up-to-date (e.g., adapted to variations of an attack) and has an appropriate scope. A well-written, well-maintained rule is one that is able to catch variations of the same attack without generating many (or any) false positives. Typically, rules have low false positives and high false negatives. Thus, conventional information security frameworks are resource-intensive and can be ineffective. For example, threat detection can be computationally expensive and hiring more security analysts to perform alert triaging can be financially expensive.

A security intelligence automation (SIA) platform using flows and a corresponding graphical user interface are disclosed herein. In various embodiments, the SIA platform provides automation for a security operations center (SOC). For example, the SIA platform can be configured to automatically identify unknown threats, triage alerts, and provide resolution. The process of identifying threats may be efficient and accurate because threats that would otherwise be buried in conventional threat detection are highlighted and threats that are not true threats are de-prioritized, as more fully described herein. For example, the SIA platform may be programmed or trained using, among other things, threat hunting techniques employed by expert security analysts such as scoring, clustering, correlation, and mapping. SIA platforms may be deployed in various locations, thus enabling cyber analytics to be employed where they are needed.

In various embodiments, a method for SIA includes selecting data associated with events. The event data may be associated with a computer network environment. For example, events may correspond to observations made about a computer system such as logins, SSO, message delivery attributes, and the like. The event data may be segmented and scored along a plurality of dimensions. Event data may be segmented along different dimensions. A ranking of each of the events may be generated based at least in part on the scoring of the event data. In some embodiments, prior to segmenting the event data, the event data is enriched with at least one attribute. In one aspect, the segmentation (and, in some cases, enrichment) analyzes various aspects to the event data and its likelihood of indicating a threat to a system.

In various embodiments, a method for providing a graphical user interface for SIA includes providing an integrated development environment (IDE) for at least one visual flow for threat detection. The visual flow (also called a "graph") is a graphical representation of a path taken (e.g., factors considered) to reach a score. The method may include rendering a visual flow interface may be rendered for generating and/or configuring the at least one visual flow. The method may provide a drag and drop process automation flow.

Figure 1:
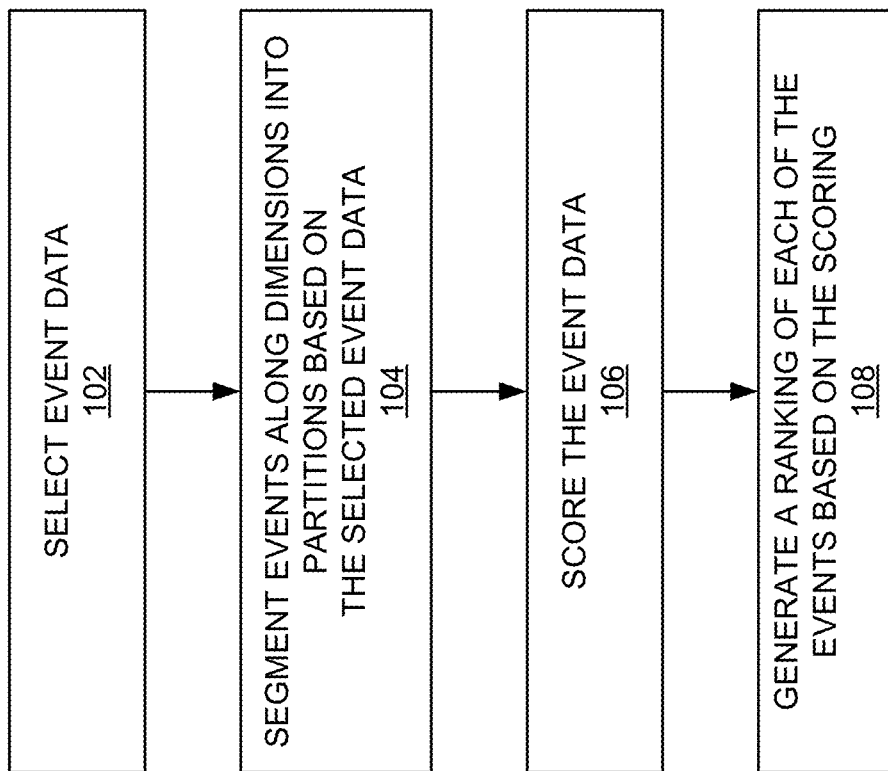
FIG. 1 is a flow chart illustrating an embodiment of a process for security intelligence automation.

FIG. 1 is a flow chart illustrating an embodiment of a process for security intelligence automation. Process 100 may be implemented by a processor such as processor 2402 shown in FIG. 24. The example process 100 may be implemented by system 400 shown in FIG. 4. Process 100 may be implemented using a visual programming language layer. In various embodiments, process 100 automatically ranks threats and generates a ranked list of events based at least in part on collected event data.

The process selects event data (102). The event data may be associated with events received at a communications interface. The event data may be collected or observed by monitoring system infrastructure such as a computer network environment. Any type of networked module or device may be monitored including network nodes, servers, personal computing devices such as mobile devices or laptops, and clusters of devices. Behaviors such as interactions between system components may be observed. Based on behaviors, an event may be generated to record aspects of the behavior for analysis. Events may be analyzed in real-time or stored for later analysis.

An event may be generated when an observed behavior meets a threshold or matches a pattern, where the threshold or pattern may be defined to indicate anomalous behavior. Events may be generated based on user interactions with various computer network system components such as a firewall, security software, operating system, switches and/or routers, badge readers, etc. For example, interaction with an ATM machine, physical badge swipe access, app login, email login, updating a database entry, may generate events. Events may be generated based on user actions such as logging into an application or database, exporting a file, downloading content, etc. In various embodiments, event data is selected from a data stream such as a time-based stream of data. The event data may include one or more components or characterized by one or more dimensions. Example event data include security events (e.g., incorrect login exceeding a threshold), system events (e.g., connection, latency, maintenance), log data, and the like. Event data may be collected by third party tools such as Splunk®, Sumo Logic®, ArcSight®, and the like.

The process segments the event data along dimensions into partitions based on the selected event data (104). Event data may be segmented along one or more dimensions to facilitate decision making about how important the event data with respect to each dimension or some combination of dimensions. The segmentation may be implemented by sorting the event data into partitions (sometimes called "buckets") along one or more dimensions. Example dimensions include group traffic, country, port, content, URL, level of suspicion (events having a similar level of suspicion are grouped into the same bucket), and the like.

The event data may be segmented along dimensions into partitions by applying one or more partitioning operations on the data. The partitioning operation may be made in a data analysis language such as Python, SQL, logical query language or a proprietary language such as Logichub Query Language. For example, the event data may be segmented by mapping a set of values to a smaller set of values such as by using MapReduce. In various embodiments, segmentation proceeds by an operation that uses a function Call Script. The Call Script function may be implemented by a script that takes in input data, and segments the input data along dimensions.

Example dimensions include system data (e.g., syslog), interface data, network data, and the like. Events may be classified into system data (e.g., syslog), interface data, network data, etc. Using the example of a cloud computing platform such as Amazon AWS®, segmentation may separate CloudTrail data from VPC Flow Log data. This allows activities captured by CloudTrail such as account activity, actions taken through a management console, software development kit, command line tools, and the like to be examined separately from other activities such as network layer traffic captured in a VPC Flow Log. Referring to the example shown in FIG. 7, dimensions along which enrichment is performed are represented by the columns in a table. For example, "user" is a first dimension, "authentication" is a second dimension, and "IP address" is a third dimension.

In some embodiments, events are classified into partitions based on a certain value along a dimension. Example partitions include specific port numbers for a port dimension, specific countries for a country dimension, specific URLS for a URL dimension, etc.

Sometimes, selected event data is not readily capable of being segmented along dimensions. In this situation, the event data may be enriched prior to segmentation. For example, suppose dimensions by which to segment is "low income," "middle income," and "high income." The received data is a numerical value of a person's income. The received data may be enriched by putting a person in the low income bucket if the income is below $30,000, the medium income bucket if the income is above $30,000 but below $80,000, and high income bucket if the income is above $80,000. The process of enrichment may be informed by the dimensions along which data is intended to be segmented or scored, as more fully described below.

In an alternative embodiment, event data is not segmented prior to scoring. For example, relatively small or simple data sets might not need to be explored along multiple dimensions prior to scoring.

The process scores the event data (106). Event data associated with an event may be analyzed or explored and assigned a value such as a numerical value, allowing the events to be ranked or sorted. The score assigned to event data may indicate the importance of the data such as being higher priority for further examination by a security analysis, being higher risk, etc. In some embodiments, event data indicating greater importance such as higher risk is assigned a higher score. In some embodiments, event data indicating greater importance such as a higher risk is assigned a lower score. A score may be a value on predefined scale such as 0 to 10. The score may be a categorization such as a color, a value on a predefined scale (e.g., 0 to 10), or other value on a spectrum, as further described herein.

The scoring may be performed manually, automatically (e.g., unsupervised scoring), or in a combination thereof (e.g., supervised scoring). In various embodiments, scoring may be learned and/or improved from observations of how a human security analyst scores an event. For example, a machine learning model may be trained such that the accuracy of its scores improves over time. An example of a feedback loop for scoring event data is shown in FIG. 2.

In various embodiments, an event is manually scored by a human security analyst. A security analyst may use a combination of industry expertise (also referred to as domain knowledge) and consideration of various pieces of data known as "context." Sometimes, the reasoning used by a security analyst may be based on and/or captured by a playbook or set of instructions representing best practices for identifying threats. The instructions may be subject to interpretation and manually executed. Often, the instructions are not formalized but rather embodied by the reasoning used by human analysts to assign a score for a threat. For example, if a human analyst receives an automated alert that an employee has logged in from a suspicious location, the analyst may follow a set of instructions: contact the employee to verify a location of the login, check a human resources database to determine whether the employee is on vacation or a work trip, and validate traffic to/from the IP address of the suspicious login location. Based on these tests, the human analyst may determine whether the alert represents a true threat. For example, if an alert is generated because an employee logs in from a location where the employee has never logged in from before, but it is confirmed that the employee is working remotely while on vacation, then the alert may be assigned a score reflecting a low risk that the alert corresponds to a true threat. The scoring may be based on inverse frequency or spike of events relative to a data set.

In various embodiments, scoring may be performed along each dimension and combined into an aggregate score. The aggregate score may be a combination such as a sum, average, or other function of one or more dimension scores. For example, an aggregate score is a combination of a score for a country associated with an IP address of a particular event, a score for a port associated with the event, and a score of downloaded content associated with the event. The aggregate score may be a weighted combination of one or more dimension scores, where those dimensions considered to be more indicative of importance are assigned a greater weight than less-important dimensions.

Figure 17B:
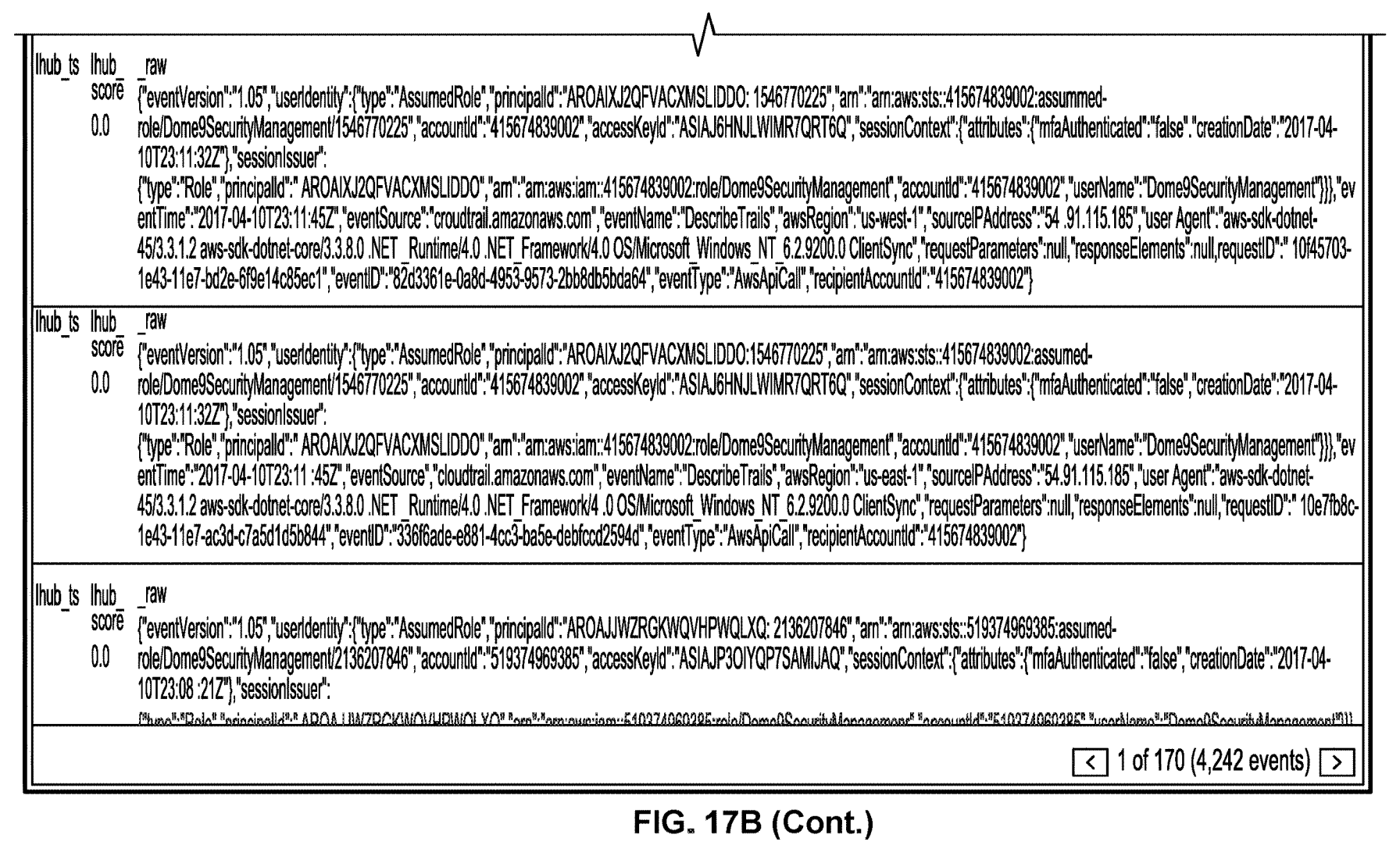

In various embodiments, a score may have an associated explanation or reason for the score. For example, the explanation may be a concatenation of explanations for each of the dimension scores. In various embodiments, the explanation associated with a score is human readable and forms an audit trail. In various embodiments, a score that meets a threshold can be visually highlighted or indicated. For example, the score may be colored differently from scores that do not meet the threshold to draw attention to anomalous scores. An example of scores and associated explanations is shown in FIG. 17B.

Figure 5:
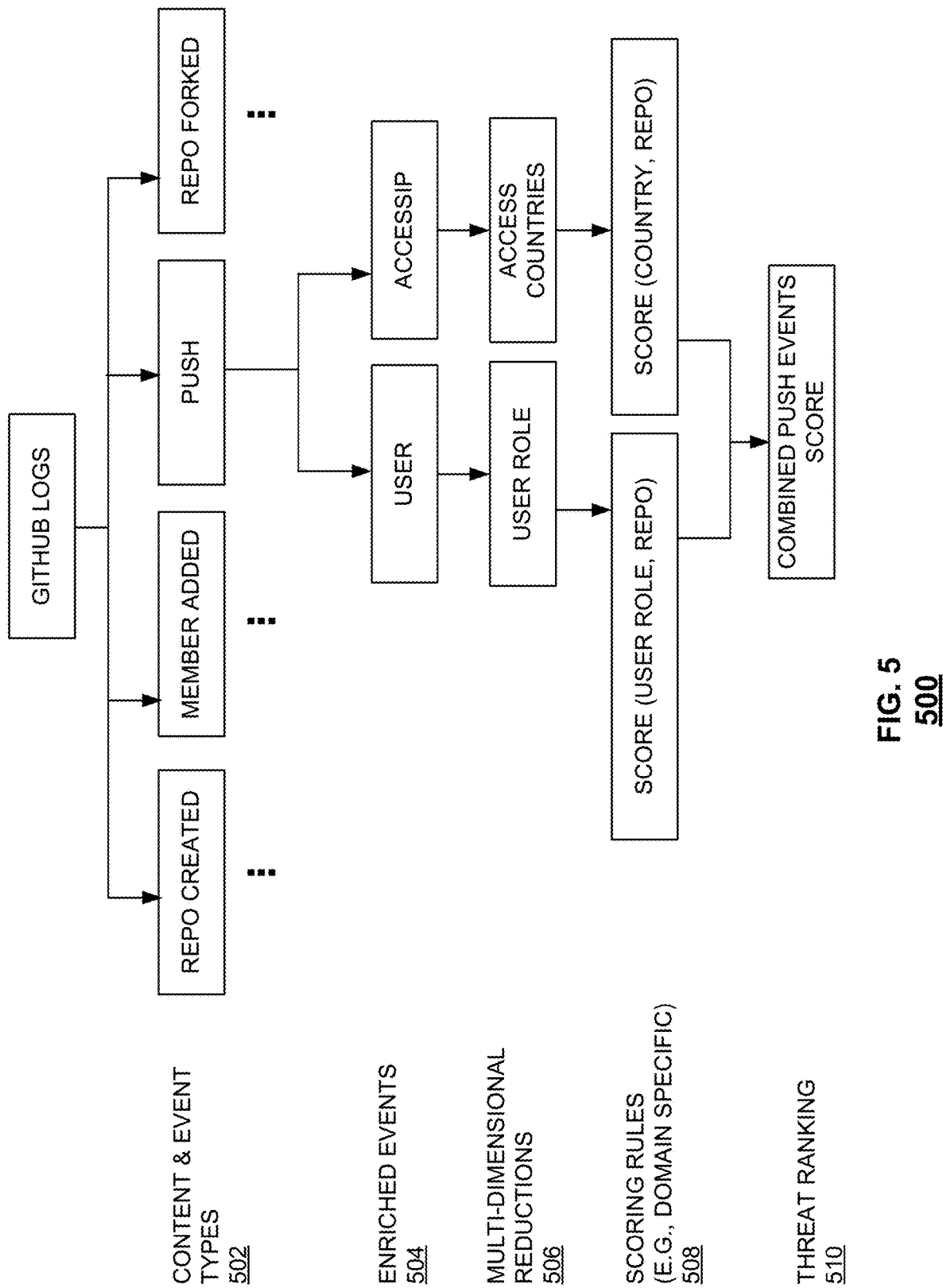
FIG. 5 is a block diagram illustrating an embodiment of a flow.
Figure 8:
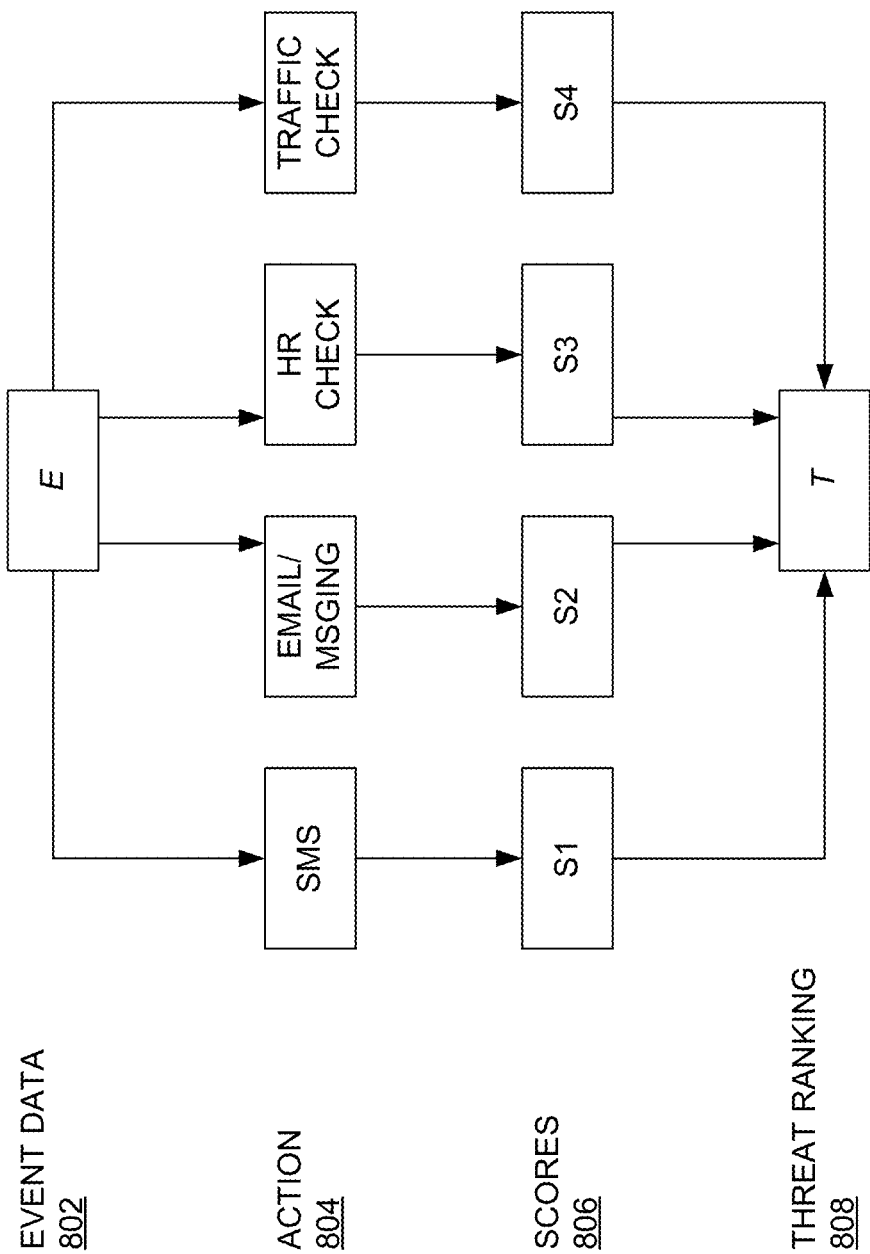
FIG. 8 is a block diagram illustrating an embodiment of generating a threat ranking for security intelligence automation.

The process generates a ranking of each of the events based on the scoring (108). The ranking may be generated by sorting scores to generate a priority order risk defining an order in which events are prioritized for further analysis. In various embodiments, the ranking indicates an importance of the event such as a level of threat of an event and/or associated confidence that the threat is a true treat. Given limited resources, this highlights more significant events (e.g., events more likely indicating a security breach) to be analyzed before less significant events. The ranking may represent an order in which events are suggested to be prioritized for examination by security analysts. For example, those events having a higher priority may be examined first. The ranking facilitates alert triaging by highlighting more important events such as those indicating a security threat. Events presented to security analysts are sometimes called "alerts" herein because alerts are those events with the highest rankings. An example of the generation of a ranking from event data is shown in FIGS. 5 and 8.

In some embodiments, those events above a threshold ranking are prioritized further analysis, while those below the threshold risk are de-prioritized for further analysis. In some embodiments, risks are classified into a pre-defined number of categories such as three categories for low, medium, and high. As another example, events may be categorized into one of a plurality of categories based on its associated importance (e.g., risk). In some embodiments, importance is represented on a continuous spectrum. For example, the importance may be represented by a numerical score on a pre-defined scale. The scale may be set to accommodate the number of analysts available to perform alert triaging. Suppose there is capacity to further analyze the top 150 events. The process may return the top 150 events at 108.

The ranking may be represented by a score, value, or other type of indication. For example, the importance may be represented by a color such as a color on a pre-defined spectrum. A low-level threat may be green, a medium-level threat may be yellow, and a high-level threat may be red.

In some embodiments, the ranking includes a pre-defined number of events considered to be most important. For example, the 20 more important events out of hundreds of thousands of events may be returned for alert triaging. In various embodiments, the risk of an event is given by a score on a scale of 1 to 10, where 1 is the least important and 10 is the most important. In some embodiments, events assigned a score of 1 to 9 represent 99% of events and events assigned a score of 10 represent 1% of events. Compared with conventional techniques, this reduces noise and helps a security analyst to focus on relatively fewer alerts having the highest priority.

In some embodiments, false positives and false negatives are identified and removed from the list of events. In some embodiments, false positives and false negatives may be de-prioritized, e.g., by being assigned a lower risk compared with other events on the list, such that they are examined if there are enough resources.

Figure 13:
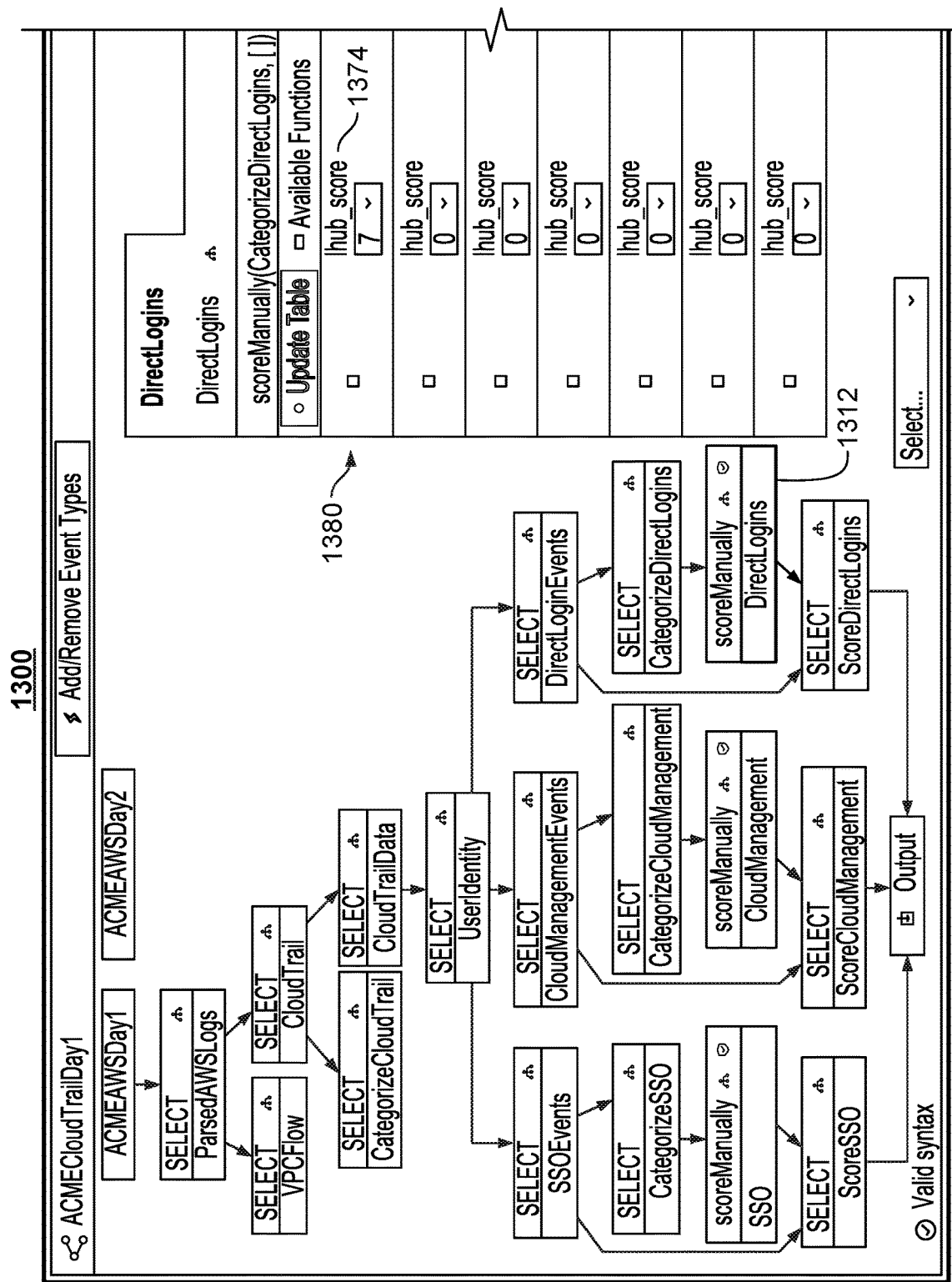
FIG. 13 is an example of a GUI configured to receive a manual score for security intelligence automation.

In various embodiments, the generated ranking may be output. For example, the ranking may be rendered on a graphical user interface or display. FIG. 13 illustrates an example of a graphical user interface showing a ranking.

In some embodiments, prior to segmenting the events along dimensions at 104, the process enriches the event data. In various embodiments, the event data selected at 102 is enriched with one or more attributes and/or features. Example attributes/features include IP address, geographical location, port, URL, timestamp, content, owner, role, and other characteristics indicating who owns the event data and the role of the event data. In some embodiments, attributes/features may be derived from other attributes/features. In various embodiments, by enriching the data, a better decision about the significance of the data may be made. In one aspect, the number of false positives and/or false negatives may be reduced compared with conventional techniques. For example, enriching data may include assigning an attribution weight to a particular feature or segment of data, allowing that feature or segment to be accorded an appropriate weight.

The attributes/features by which event data is enriched may be determined in various ways. For example, the enrichment may be informed by the dimensions by which the event data is to be later segmented or scored. An IP address may be given by a whois IP address lookup. The IP address may provide information about a geographical location (e.g., country) of origin, owner, and role associated with event data. The IP address may indicate whether the associated event source or destination is trustworthy. The historical behavior of the IP address may be evaluated to determine trustworthiness of the IP address. For example, if the IP address is on a blacklist, this may make the event data likely to be indicative of an attack. For example, if event data originates from a suspicious IP address, is destined for the suspicious IP address, or has been relayed by the suspicious IP address, the event data may be prioritized for further analysis.

A port and its associated use or application may indicate whether the event data should be prioritized for further analysis. For example, event data received on an SSH port may be useful for determining vulnerabilities in network service operations such as compromise of SSH keys. As another example, a port may be assessed to determine suspiciousness based on recent activities (e.g., unusual pattern of activities in the past 24 hours).

A URL request may be used to determine reputation and/or trustworthiness. A URL or other information may indicate who owns the event data and/or the role of the event data. The URL may assessed using one or more sources, e.g., a third party tool such as Blue Coat WebPulse® and/or VirusTotal® to determine the reputation of a website associated with the URL. If the reputation is below a threshold, the associated event data may be prioritized for further analysis.

One or more attributes/features may be derived from other attributes/features. For example, geographical information may be determined from an IP address. A geographical location may provide information about trustworthiness. For example, if a large number of cyberattacks originate from a particular city, event data associated with that city may be prioritized for further analysis.

The enrichment of the event data may include considering several attributes/features together. Suppose that a country of origin alone is not suspicious. However, when considered with the time of day an upload is made and the size of the upload, the event is suspicious, and thus may be prioritized for further analysis.

FIG. 2 is a flow chart illustrating an embodiment of a process for scoring based on feedback. Scoring may be improved based on feedback. The process scores values along a dimension (202). In various embodiments, the score reflects an evaluation of risk associated with a dimension. In some embodiments, a score is automatically assigned to a dimension based on the techniques described herein, e.g., 110 of FIG. 1. The scoring may be performed manually, e.g., by a security analysis, in a supervised manner, or automatically in an unsupervised manner. The process receives feedback about the scored dimension (204). For example, a security expert such as a human analyst may assign a score based on the event data, and the expert-assigned score may be compared to the machine-assigned score. As another example, a security expert such as a human analyst may evaluate the score and provide feedback about the accuracy of the machine-assigned score. As another example, one machine-assigned score may be compared to a score assigned by another machine. The feedback about the scored event data (204) may be provided via a graph and extracted from an executable code translation of the graph. The feedback may be provided as a rule. The process updates a training model based on the received feedback (206). For example, a machine learning model may be updated with the feedback on the score.

The example process 200 finds application in training a machine learning model. For example, a machine learning model may be trained such that the accuracy of its scores improves over time. In some embodiments, a human analyst reviews a machine-assigned score. The human analyst may provide feedback on the machine-assigned score, and, in some cases, may assign a different score. The machine learning model may be trained using the feedback provided by the human analyst to improve the scoring methodology of the machine learning model.

In various embodiments, various operations for a security operations center is automated using flows. A flow is logic configured as a script that can be periodically run as part of a stream of data (such as an event data stream). In some embodiments, flows are compiled from pre-packaged flows (sometimes called "template scripts" or "template flows") for threat detection for event data streams. A pre-packaged flow may include a pre-defined script provided with a security intelligence automation platform to execute various default functions. For example, when various nodes are positioned in a pre-defined pattern relative to each other, a pre-packaged flow may automatically execute pre-defined functions. Pre-packaged flows can be automatically adapted for a user by providing parameters using pre-packaged flows. For example, flows may be adapted to recognize threats when there are activities associated with a pre-defined list of high risk countries. The pre-packaged flow provide the opportunity for customization by taking in user-defined parameters. The flow may be compiled and executed for processing the event stream. In some embodiments, flows are scheduled to execute as periodic jobs on event stream data such as for an enterprise network. In one aspect, the flows facilitate scalable processing of event stream data for threat detection. In various embodiments, the flows have mesh configurability. For example, at least a portion of one flow may be merged with at least another portion of a second flow.

In various embodiments, a query may be pivoted for threat detection. A query may be pivoted to refine threat hunting. For example, an alert may be assessed along a particular dimension. If the assessment along that dimension merits further analysis, then output from the initial analysis on that dimension (first query) is input to a second query. Suppose a user sends 2000 emails. The user's behavior can be checked against other users or against the same user's historical behavior. If sending 2000 emails is abnormal, then a pivot query can be triggered for this user. The user's action of sending 2000 emails, triggers further analysis of that user's general behavior such as URLs that the user has visited. In other words, evaluation along one dimension for an alert can trigger analysis along other dimensions of that alert by making a pivot query using results of the evaluation of the first dimension.

FIG. 3 is a flow chart illustrating an embodiment of a process for rendering a visual flow interface for security intelligence automation. Process 300 may be implemented by a processor such as processor 2402 shown in FIG. 24. The example process 300 may be implemented by system 400 shown in FIG. 4. For example, process 300 may be implemented using a visual programming language layer. In various embodiments, process 300 automatically translates a graphical representation of threat rankings (also called "rankings" or "risk rankings") to executable code and/or translates executable code to a graphical representation of threat rankings. In various embodiment, process 300 represents a ranking graphically, and user interaction with the graphical representation of the ranking facilitates threat detection and alert triaging.

Figure 11A:
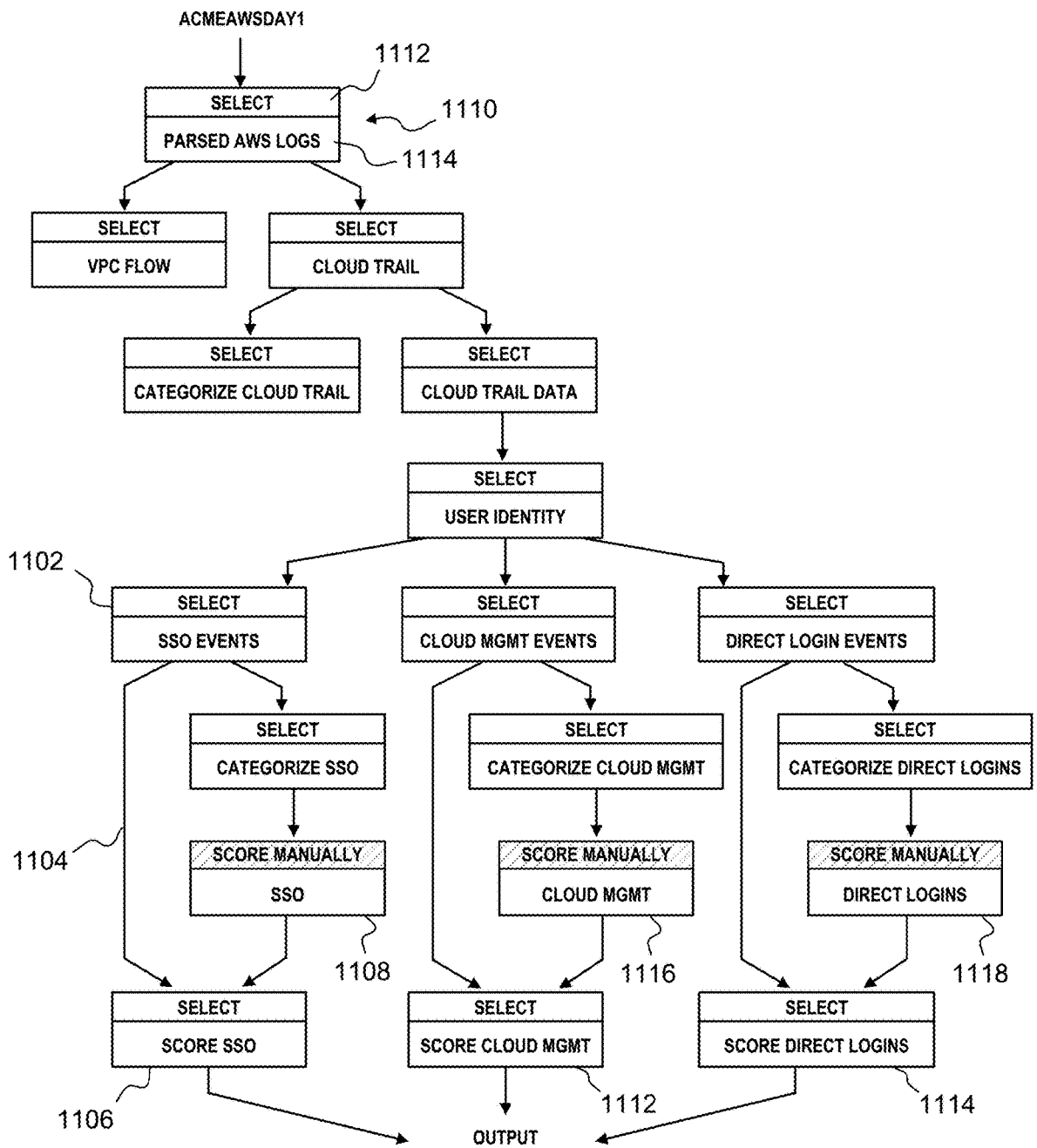
FIG. 11A is an example of a visual flow for security intelligence automation.

The process receives a visual flow (302). In various embodiments, the visual flow (sometimes called a "graph") is a visualization of a flow. The flow may be generated as part of a threat detection, ranking, alert triaging process, or the like. The graph may be rendered as part of an IDE. In some embodiments, the graph is built using a graph library such as a JavaScript® graph library. An example of a graph is shown in FIG. 11A.

The process translates the visual flow to executable code (304). For example, the visual flow may be translated to a query language such as LQL. In various embodiments, the visual flow is translated to an intermediate language such as JSON prior to translation to executable code that can be edited, compiled, and executed.

The process executes the code (306). The execution of the code may include analysis of the code to perform or facilitate threat detection, ranking, alert triaging, and the like. In various embodiments, the executable code may be parsed to obtain data for automatic threat detection. For example, the executable code may include information about event data in a data stream. The event data extracted from the executable code may be the event data selected at 102 of FIG. 1. As another example, user interaction with the graph may cause executable code to be modified. A user such as security expert may assign a score to an alert, causing executable code to be updated. The information provided by the security expert may be extracted from the executable code or translated from the graph manipulations to improve subsequent threat detection and/or scoring, as further described herein. Example user interactions are further described herein, e.g., with respect to FIGS. 12-23. Referring to FIG. 2, the feedback about the scored event data (204) may be provided via a graph and extracted from an executable code translation of the graph. A training model may then be updated based on the feedback.

A user may drag and drop components of the graph such as graph nodes, add events, and the like as further described herein. In various embodiments, a drag and drop ranking automation flow includes translating at least one visual flow to executable code, executing the code, attaching a result of the execution to the code (e.g., a node of a visual flow), and outputting a result of the execution of the code in tabular format, as further described below.

The process attaches a result of the execution of the code (308). In various embodiments, analysis of the executable code results in a change that is to be represented in the visual. The result of the execution may be attached to various parts of the visual flow. For example, a node of the visual flow may have the result of the code execution (e.g., in tabular format) attach or become associated with the node.

The process outputs a result of the code execution in a tabular format (310). In some embodiments, the output of the result may be translated for rendering in a graph. For example, executable code may be translated to JSON, allowing the code to be represented by a graph such as by using a JavaScript® graph library.

A threat ranking engine may be built graphically and visually presented. In various embodiments, when a flow is built, a trace may be automatically generated. For example, metadata may be added to a table of scores (e.g., by row). An example of a table of scores is 1380 of FIG. 13.

FIG. 4 is a block diagram illustrating an embodiment of a security intelligence automation platform. The example system 400 shown in FIG. 4 is a visual builder configured to implement one or more processes described herein. In various embodiments, the visual builder takes a graphical representation (a graphical representation may be easier for a human analyst to use), translates the graphical representation to code, and executes functions on the code. A user may manipulate the graphical representation, e.g., add or remove nodes. The visual builder may translate the manipulation of graphical representation to executable code.

The system includes a user interface 402, a flow builder 404, a flow parser 406, an execution engine 408, a distributed computing system 410, and a flow scheduler 412.

The user interface 402 is configured to display content, which may include graphical and/or non-graphical content. Example graphical user interfaces that may be displayed on the user interface 402 are shown in FIGS. 9A-23. The user interface 402 may be a browser such as a Web browser, an IDE, and the like. As further described herein, one or more flows may be built by interacting with the user interface. For example, a user may provide an input data set, add one or more node, and score the one or more node on a graph. In one aspect, this allows a user to drill down on various aspects of a flow without losing context. For example, the user may zoom in to add a node and provide details about the node, then zoom out to view a larger portion of a flow.

In various embodiments, a node of the graph has an associated table of event data such as table or spreadsheet of data. Manipulation of the node by a user via a GUI causes the event data associated with the node to be explored, scored, enriched, etc. The graph may be made up of a variety of types of node, where each type of node has associated capabilities or roles. In various embodiments, node manipulation causes a script to be automatically executed, event data associated with the node to be enriched or score, and the like. Example node types include event type node, analysis node, task node, and scoring node. An event type node stores data, which data can be explored to determine a type of event that occurred. An analysis node store event data, which data can be analyzed. A task node stores data and/or scripts, where the scripts can be executed to obtain more information about the data. For example, a script may be executed on the event data to generate an output. For example, a script may be executed on a table of URL addresses to check each of the addresses to be checked against a database of reputations such as VirusTotal® to determine the reputation of each address. A scoring node is adapted to score event data associated with that node. In some embodiments, the scoring node can perform unsupervised (e.g., programmatic) scoring in which a score is assigned to event data according to pre-programmed instructions and knowledge that may be acquired via machine learning. In some embodiments, the scoring node can perform supervised scoring in which a user provides feedback for scoring, e.g., scoring is performed in cooperation with manual input.

The flow builder 404 is configured to build one or more flows. A flow is logic configured as a script that can be periodically run as part of stream of data (such as an event data stream). For example, a flow may be executed periodically (such as every 15 minutes or hour) to detect threats. A flow can be created based on domain knowledge and implemented by a playbook (e.g., rule set). A flow can be adapted to a user's particular needs.

The flow builder may be invoked when a corresponding portion of the user interface is selected. For example, when "flows" is selected in the user interface, the flow builder is invoked. In various embodiments, a user may add an input data set such as an event type (e.g., CloudTrail). Using the graphical user interface, the user may add a node as desired to the event type and score one or more of the node. The graph visualizes the relationships between node and allows a user to quickly understand the path that leads to a child node, and correspondingly the causes, effects, and correlations of the child node.

The flow parser 406 is configured to parse one or more flows. In various embodiments, the flow parser receives a flow and parses the flow to determine flow components. The parsed flow may be analyzed to determine how to execute the flow.

The execution engine 408 is configured to determine one or more data analysis tasks/jobs based on the parsing. The data analysis tasks may include execution tasks to carry out the received flow. The data analysis tasks may be written for a cluster computing framework such as Apache Spark®. For example, the data analysis tasks/jobs are defined using an Apache Spark® library.

The cluster computing framework 410 is configured to execute tasks/jobs determined by the execution engine. The cluster computing framework may execute the tasks/jobs using Hadoop, MapReduce, and the like. For example, Apache Spark® typically uses DataFrames to execute jobs. A DataFrame is a table of data. Each job produces a DataFrame. An operation may be applied to a first DataFrame to generate a second DataFrame.

The flow scheduler 412 is configured to schedule one or more flows. The flow scheduler produces a stream, which is a wrapper around a flow. In various embodiments, the flow scheduler defines a time in which flows are processed by the cluster computing framework 410. For example, flow scheduled may schedule a flow to begin execution at 10:00 and run every 15 minutes.

In operation, in response to a request made via user interface 402, flow builder 404 builds a flow such as a flow based on CloudTrail data. A user defines a flow via user interface 402. The flow builder builds a flow based on the user interaction with the user interface. The flow parser maps the flow for execution by translating flow information so that it is intelligible to the execution engine 408. The execution engine runs/executes the flow by executing the steps inside the flow. The execution engine may be defined using a library. The execution engine may use a cluster computing framework 410 to execute its tasks in the order defined by the flow scheduler. The timing of execution may be defined by a flow scheduler 412. For example, the flow scheduler takes a flow and determines when (e.g., relative to other flows) the flow is to be executed. For example, the flow can be executed on demand by a user via a user interface, API call, or the like. The flow can be scheduled for execution periodically or at a pre-defined time.

FIG. 5 is a block diagram illustrating an embodiment of a flow for security intelligence automation. The example flow 500 shown in FIG. 5 may be constructed and updated through SIA such as threat detection and alert triage according to the processes described herein, e.g., as shown in FIGS. 1 and 2.

In various embodiments, implementing SIA as a visual programming language layer allows a security analyst to interact with a process of threat detection and alert triage. For example, the security analyst may provide feedback on detected threats such as whether the threat was accurately identified. This is sometimes referred to as "human-in-the loop machine learning." A deep network may be built based at least in part on feedback provided by a security analyst. The security analyst's reasoning (which may be complex) can be concisely represented, sorted, and shown in a visual programming representation. An analyst uses a visual flow interface to visualize mappings and reasons for why an event is considered to be a particular risk, e.g., assigned a particular score. In one aspect, the analyst may reveal the analyst's reasoning by interacting with the visual flow interface. This reasoning may be captured and learned by a SIA system. For example, (deep) neural nets may be built based at least in part on analyst interaction with the visual flow interface.

Flow 500 includes one or more content and event types 502, one or more enriched events 504, one or more multi-dimensional reductions 506, one or more scoring rules 508, and one or more threat rankings 510. In this example, there are four events ("repo created," "member added," "push," and "repo forked"). These four events are event types that may be found in Github logs. One or more of these events may be selected for processing. In this example, push events are processed and ranked. The other event types may be evaluated as well. For simplicity, only push event scoring is shown and explained here.

One or more enriched events 504 may be the result of enriching the event(s) 502. In this example, push events are enriched to obtain "user" and "accessIP" as shown. In various embodiments, the enriched events 504 may be segmented (e.g., 108 of FIG. 1). The segmented events correspond to multi-dimensional reductions 506. In this example, enriched event user is segmented along dimension "role" describing the role of the user (e.g., developer), and event accessIP is segmented along dimension "countries" describing the country from which access is requested or made by the user.

In various embodiments, scoring may be performed for each of the dimensions 506 by applying scoring rules (508). The scoring may be provided automatically by a system and/or with input from a security analyst, who may be a human. The scoring rules may be domain specific. For example, the expertise of a security analyst familiar with a specific technical field or system may be leveraged in the scoring process. SIA may be improved over iterations as security analyst input helps the SIA system to become better at scoring. An example of a feedback process to improve scoring is shown in FIG. 2. In the example of FIG. 5, scoring is performed by grouping by user role and repository and scoring based on user role and repository. Scoring is also performed by grouping by country and repository and scoring based on country and repository.

In various embodiments, threat rankings 510 are generated by combining scores corresponding to one or more dimensions. The threat ranking may be a color, a number on a predefined scale, or other value on a spectrum (e.g., 108 of FIG. 1). Here, the threat ranking is based on a combination of two scores: one score for user role and repo and another score for country and repo. The combination of which dimensions to combine to obtain a threat ranking may be defined by as security analyst, according to a rule, or the like. For example, a combination may be made by programmatically weighing each dimension. As another example, a combination may be made by teaching by example to heuristically reach a combined score. Teaching by example may be by a neural network, nearest neighbor search, learning from a security analyst via pattern matching similarity to known solutions, and the like.

FIG. 6 is a flow chart illustrating an embodiment of a process for threat detection. Process 600 may be implemented by a processor such as processor 2402 shown in FIG. 24. The example process 600 may be implemented by system 400 shown in FIG. 4. In various embodiments, process 600 builds or modifies a flow based on ranking and threat detection. A SIA platform combines machine learning and human input by identifying and categorizing existing behaviors, allowing human input and specific domain knowledge to improve threat ranking by a processor.

In some embodiments, in a first iteration, the SIA system sorts and/or categorizes events, adds outside sources (if any), and enriches the data. The system may receive human analyst input and domain specific threats. The system then enables machine learning by creating flows (sometimes called "deep logic nets"). In a second iteration, flows may be refined.

The process sorts and/or categorizes events (602). An event may be sorted and categorized by dimensions of the event such as active directory, user group, authentication method used, and IP address of origin, destination, etc. Example categories are shown in FIG. 7A.

The process enriches data associated with the events (604). Data may be enriched with additional information that is known or can be derived based on the data or categorization of the data. For example, data categorized by IP address may be enriched with geographical information because IP address provides information about a city, country, or other geographical location. The enriching information may be determined from outside sources such as a library. Enriching information may be learned as more data is received, e.g., by recognizing correlations or patterns. An example of event enrichment is shown in FIG. 7B. In some embodiments, after enrichment, events are resorted and grouped. For example, after enriching events with geographical information based on an IP address associated with an event, the events may be resorted by geographical information.

The process scores event data based on the current flow (606). Scoring may be performed by combining scores for dimensions. An example of scoring is described with respect to 106 of FIG. 1. In various embodiments, after scoring, the process proceeds to 608 in which the process determines whether the current process is a first iteration.

The process determines whether the current process is a first iteration (608). If the process is a first iteration, the process proceeds to 610 in which domain specific information is received. Otherwise the process proceeds to 612 in which the process determines whether there is a disagreement with the scoring. The process may be in a first iteration if this is the first time the process is being performed. The process may be in a subsequent iteration if the process is being performed after a first iteration has been completed. For example, the process may be performed on a day after the first iteration of the process.

The process receives domain specific information (610). Domain specific information refers to insights that are specific to a particular field. For example, in a banking setting, domain specific knowledge may be indicate that withdrawing cash from an ATM machine is typically less safe than transferring money via an Internet banking app. In some embodiments, domain specific information includes human input such as feedback provided by a security analyst. An example of feedback is further described herein with respect to 204 of FIG. 2. In some embodiments, the domain specific information is used to update or correct a score. An example of a score correction is shown in FIG. 7D. In some embodiments, one or more dimensions may be unscored because this is the first iteration. For example, if there is insufficient information, a dimension associated with an event is not scored.

The process determines if there is a disagreement with scoring (612). For example, the process may evaluate the score assigned in 606 (which, in some cases is updated at 610). In various embodiments, the evaluation includes presenting the score to a security analyst for manual review. The security analyst may indicate whether the analyst agrees or disagree s with the score. In some embodiments, the security analyst assigns a score, and the process compares the manually assigned score with the score assigned at 606 to determine if there is a disagreement. Because a flow is adapted to obtain an accurate/desired score (e.g., as defined by a security analyst), the evaluation of whether there is a disagreement with the automatically assigned score helps to refine and improve a flow such that the next time the flow receives similar data, a more accurate/desired score is automatically assigned.

If there is disagreement with the scoring at 612, the process performs root cause analysis (614). In various embodiments, the root cause analysis includes review of a flow performed by a security analyst. In various embodiments, root cause analysis traces a flow to find a scorer or a factor affecting scoring. For example, a score is based on a path associated with a first dimension (e.g., user) but not a second dimension (e.g., country). When there is a disagreement with the score, scoring may be updated to account for other dimensional values.

The process updates scoring (616). The process may update scoring by adding a path such that a dimension that was not considered for the previous score is now considered. Suppose a score is obtained from only a path associated with a first dimension (e.g., user). A second path associated with a second dimension (e.g., country) may be added such that the score is a weighted combination of the result of traversing both paths. The process then returns to 612 to determine if the security analyst is in agreement with the updated score.

Process 600 will now be explained using the example of an account takeover situation. In an account takeover situation, someone who does not have authorization to access an enterprise system or resource tries to access the system/resource by taking over the account of a user who does have permission to access the enterprise system. The intruder may take over the account by stealing the user's login credentials, spoof the user's ID and/or IP address, and the like. Although chiefly describing using the example of an account takeover, processes 600 and 650 find application in other security situations such as malware and the like.

FIG. 7A is a block diagram illustrating an embodiment of detecting threats in an account takeover situation. Threats may be detected by reviewing data associated with logins to an enterprise network such as by using VPN. For example, a VPN server maintains logs of login activity such as a user name and IP address associated with a login attempt. The logs may be reviewed to detect threats. Table 700 shows a portion of an example VPN server log, where each row represents an entry in the log. Here, user Joe attempts login via an enterprise access gateway from IP address 151.101.9.11. Although only five entries are shown in this example, there can be many events (e.g., login attempts) per day such as on the order of 100,000 events per day. Threat ranking is performed to determine whether any one of events is suspicious enough for an analyst to investigate further.

The data that is reviewed may be collected from another system. For example, a connection to the other system is set up. An event type is created that uses the connection, and a query is made to the other system in a language that the other system understands. An event type is added to a flow. For example, the event type is loaded into a security intelligence automation platform to build a flow. The event is added to the flow, a time range can be selected (e.g., by a user), and results can be previewed.

FIG. 7B is a block diagram illustrating an embodiment of detecting threats in an account takeover situation. In the example shown in FIG. 7B, table 750 shows enriched data. More specifically, table 750 shows the data of table 700 enriched with two additional pieces of information: department (sometimes referred to as "role") and "access country." This information can be derived from the information ins table 700. For example, the department can be determined by looking up a user in an employee directory to determine that user's role. Access country can be determined from the IP address.

Information for an event (e.g., a row in table 700) may be verified using the enrichment information. For example, Joe and Suzie are part of AD1. An indicator of suspicious activity may be that a user associated with a particular active directory has attempted an event not permitted for that active directory. That is, to check whether there has been suspicious activity, permissions associated with members of active directory 1 may be checked to determine whether those members are permitted to login via enterprise access gateway to the US. Suppose members of AD 1 are typically not allowed to login via enterprise access gateway to the location associated with IP address 10.3.9.11. In some embodiments, this causes Joe's entry to be marked as suspicious, e.g., by assigning a relatively higher score to the event associated with the first row.

FIG. 7C is a block diagram illustrating an embodiment of detecting threats in an account takeover situation. Table 770 shows each entry with an associated score. Scores may be assigned in a variety of ways including manually and automatically.

Manual scoring may be performed using a lookup table. The lookup table may store scores for a combination of a particular department and access country. For example, a combination of "dev" and "US" gets assigned a score of 0, a combination of "finance" and "US" gets assigned a score of 0. All other combinations can receive a default score of 8 because they are unknown and may be potentially hazardous.

Supervised scoring can be performed. For example, combinations that have been previously seen today are assigned the same scores that they were assigned earlier today. In some cases, a security analyst corrects a previously automatic score. The system will use the corrected scored made by the security analyst if the same combination is seen later. Example scores include a frequency score, entropy score, a randomness score, a whitelist score, and the like. Each of the example scores can be machine learned and filtered/combined scores can be machine learned based on semi-supervised data sets.

In table 770 of FIG. 7C, entries with a combination of "Dev" and "US" or "Finance" and "US" are assigned scores of 0 because they are expected combinations. The other combinations are assigned scores of 8, which would prioritize those events for further examination over other lower-scoring events.

FIG. 7D is a block diagram illustrating an embodiment of detecting threats in an account takeover situation. In the example shown in FIG. 7D, table 700 shows example modifications to the threat rankings. The scores assigned in FIG. 7C may be modified by a human security analyst, as shown in FIG. 7D. Here, the score for the second entry "Suzie" is modified to "10," because the access country is suspect. The score for the third entry "Chuck" is modified to "1," because the security analyst determines that there is a finance department operating in the access country or the user is traveling on business to that country. For example, the security analyst may determine that the combination of "Dev" and "RU" is sufficient and thus lower the score to deprioritize that event for alert triaging. A security analyst may be alerted to evaluate a baseline score (e.g., the original score assigned in FIG. 7C) by a notification such as email, SMS, or the like. The security analyst reviews and/or updates the score and table 790 is generated accordingly.

FIG. 8 is a block diagram illustrating an embodiment of generating a threat ranking for security intelligence automation. In the example shown in FIG. 8, event data 802 "E" is segmented into various actions. Here, the actions 804 include SMS, Email/messaging, HR check, and traffic check. Suppose the event is a suspected account takeover situation in which an unauthorized entity attempts to access enterprise resources by taking over an authorized user's account. The event is an attempted login. In this example, four actions 804 are taken to check the login. SMS refers to checking content and metadata associated with an SMS associated with a login. For example, as part of an authentication process, a user may be sent an SMS with a link to proceed with the login process. Email/messaging refers to checking content and metadata associated with an email/messaging associated with a login. For example, as part of an authentication process, a user may be sent an email or message with a link to proceed with the login process. Based on the SMS or email/message, information about the recipient or sender may be derived such as from an IP address. HR check refers to a check made with human resources. For example, vacation requests may be consulted to determine whether the user is expected to be somewhere other than a typical work location. A traffic check refers to checking network traffic such as port information and the like.

Each of the actions 804 may be assigned a corresponding score 806. Here, the scores are represented by S1-S4. The scores may be numbers, ratings, or other evaluations of threat based on the associated action. The scores may be aggregated into a threat ranking 808, here "T." The threat ranking may be a value on a pre-defined scale indicating the level of threat associated with the event E. Example scores are further described herein, e.g., with respect to FIG. 1.

Figure 9:
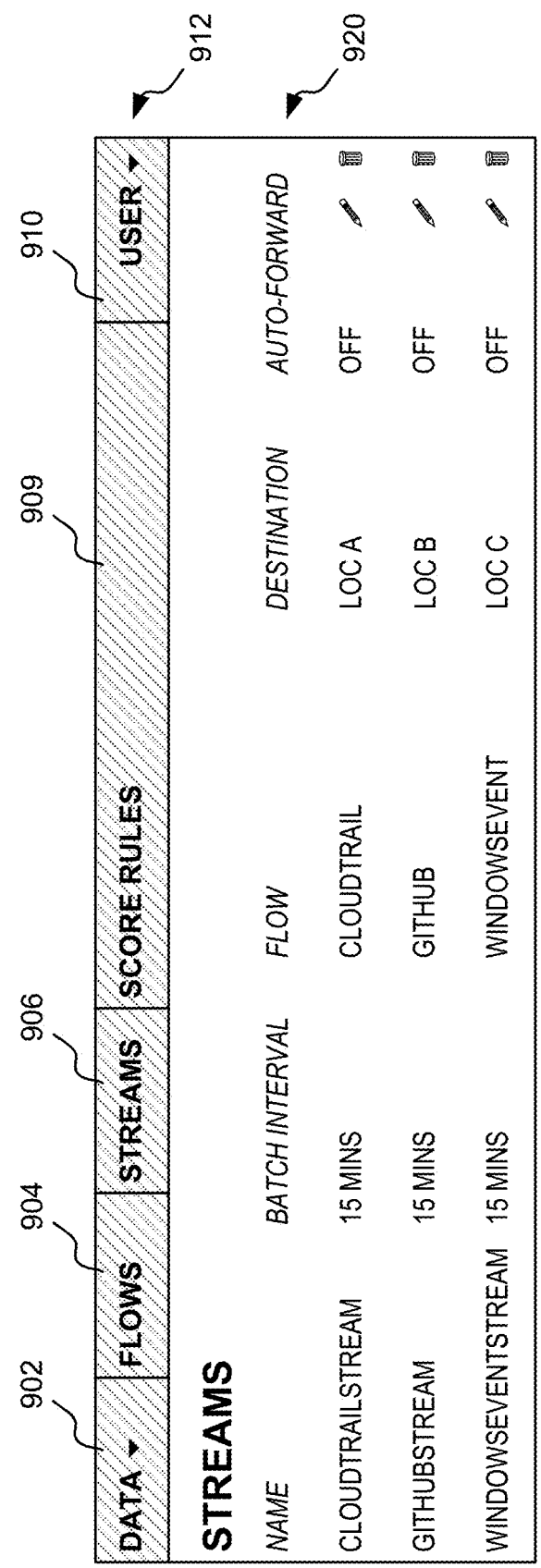
FIG. 9 is an example of a graphical user interface (GUI) for security intelligence automation.

FIG. 9 is an example of a graphical user interface (GUI) for security intelligence automation. In some embodiments, GUI 900 is used to view and manage flows. GUI 900 may be part of an IDE. GUI 900 includes a toolbar 912. The toolbar includes various options including Data 902, Flows 904, Streams 906, Score Rules 908, and User 910 allowing a user to navigate to corresponding pages.

For example, selecting Data 902 causes data, which may be raw data or processed data, to be displayed. The data may include event data such as data streams, as further described herein. Selecting Flows 904 causes one or more flows to be displayed. In example GUI 900, three flows are shown: "CloudTrail," "Github," and "WindowsEvent." Details about these flows may be displayed in response to selection of Flows 904. An example of a flow "AcmeCloudTrail-Day1" is shown in FIGS. 11B-16. Selecting Streams 906 causes information about Streams to be displayed. A stream refers to a combination of a flow and a schedule. Selecting Score Rules 908 causes rules about scoring to be displayed. Score rules may define how to score an event. Selecting User 910 causes options and/or information associated with a user to be displayed. For example, a user profile may be displayed, one or more preference settings and/or options may be displayed, and the like.

FIG. 9 shows a state of the GUI 900 after Streams 906 has been selected. In this example, in response to selection of Streams 906, collected streams of data are displayed in portion 920. In this example, data has been collected for CloudTrail, Github, and WindowsEvent. The batch interval for each of these data streams is 15 minutes, which means that data is collected every 15 minutes. The batch interval may be selected by a user or pre-defined automatically. In this example, the name of the flow corresponding to Cloud-Trail is "CloudTrailStream." The destination of a flow refers to one or more modules or devices for which data is destined. The processes described herein may be applied to the data before it has reached the destination. In some embodiments, the destination may be the same as the source. Here, for example, the flows from CloudTrailStream, GitHubStream, and WindowsEventStream are destined for locations Loc A, Loc B, and Loc C respectively.

Auto-forwarding is turned off for each of the flows. In this example, with auto-forwarding turned off, data is not automatically forwarded to the destination. In some embodiments, auto-forwarding may be turned on to allow the data streams to be automatically forwarded to other devices or flows when a process completes.

The manner in which data is collected may be edited or modified. For example, selecting the pencil icon allows a user to modify aspects of the flow such as the batch interval, the name, etc. Flows may be deleted by selecting the garbage can icon. When a flow is deleted, data associated with the flow is no longer collected and/or stored for the flow.

FIG. 10A is an example of a GUI for security intelligence automation displaying raw data with an associated source and host. In some embodiments, GUI 1000 is part of an IDE. The information shown in GUI 1000 may be generated from log entries. For example, log entries captured by a monitoring system is processed, and each event is represented by a row in GUI 1000. In various embodiments, a row may be generated by extracting information in a log entry corresponding to the categories (here, columns "source," "host," "message time," "size," and "raw data").

In example GUI 1000, information such as a source, host, message time, and size associated with raw data may be displayed along with the raw data. Here, three events are displayed. The first event is represented by the first row in the table, the second event is represented by the second row in the table, and the third event is represented by the third row in the table. The source may be displayed in various formats. For example, a source category, specific source module name, and the like may be displayed. The source of the first entry is IT logs. IT logs include log information such as CloudTrail IT logs in Amazon AWS®. The source of the second and third entriesis DMZ logs. DMZ logs include diagnostic logs such as DMZ logs in Amazon AWS®. The host for each of the first, second, and third events is "Sumo Cloud." The message time for the first and second events is 16:27:17.000-0700 on Apr. 10, 2017. The message time for the third event is 16:26:58.000-0700 on Apr. 10, 2017. The size of the raw data for the first event is 1074 kB and the size of the raw data for each of the second and third events is 1062 kB.

In various embodiments, the raw data forms at least part of an explanation for the hub score. For example, the raw data includes one or more characteristics that are analyzed to determine the hub score. These characteristics may include factors considered in the determination of the hub score, and, correspondingly, may explain why the hub score is a particular value. In various embodiments, the raw data displayed in GUI 1000 is human-readable, allowing a human user to quickly determine an explanation for the score. The raw data may include event version, user identity, assumed role, principal id, attributes, multi-factor authentication (MFAAuthenticated), creation date, session issuer, role, event time, source IP address, user agent, request parameters, recipient account ID, and the like.

Figure 10B:
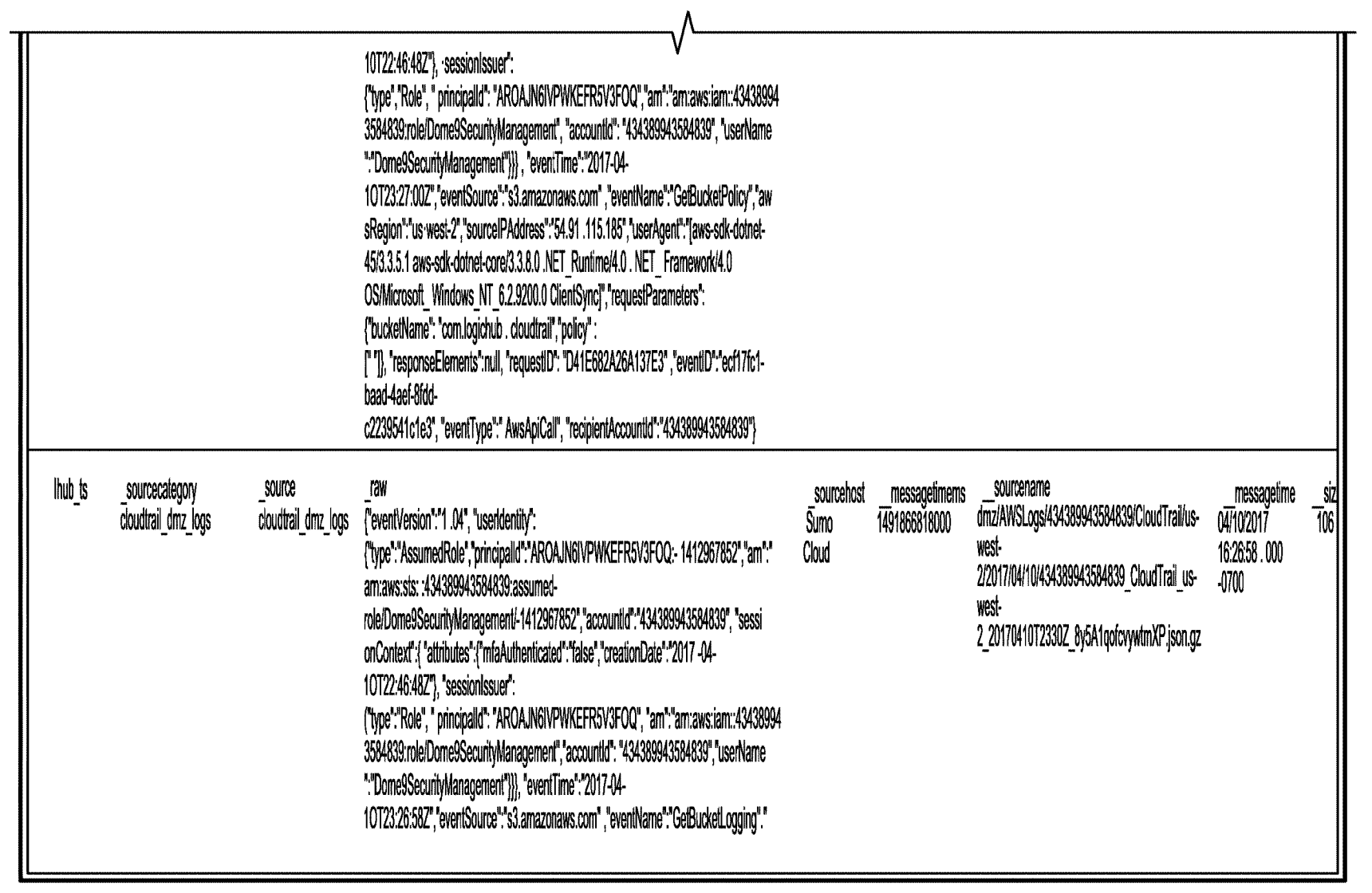

FIG. 10B is an example of a GUI for security intelligence automation displaying raw data with an associated source and host. In some embodiments, GUI 1050 may be part of an IDE. The example GUI 1050 includes example values of the source (category, name), message time (messagetimems, time stamp), hub time stamp (lhub_ts), raw data, and size. In some embodiments, sources may use different time stamp conventions or names. The differences can be reconciled by mapping to a common field.

The example GUI 1050 shows raw data for Day0 at an associated time period 1002. In this example, raw data is displayed for the half-hour time period between 14:45 and 15:15 on May 11, 2017. In various embodiments, raw data may be filtered prior to display. For example a particular category of events may be displayed such as firewall, apps log data, audit events, and the like. A user may select via filter menu 1004 the types of events for which raw data is to be displayed. In the example GUI 1000, raw data for all events are displayed. In this example, the source of the events is a json.gz file, which is a zipped JSON file. This system may extract events from the source.

Figure 11B:
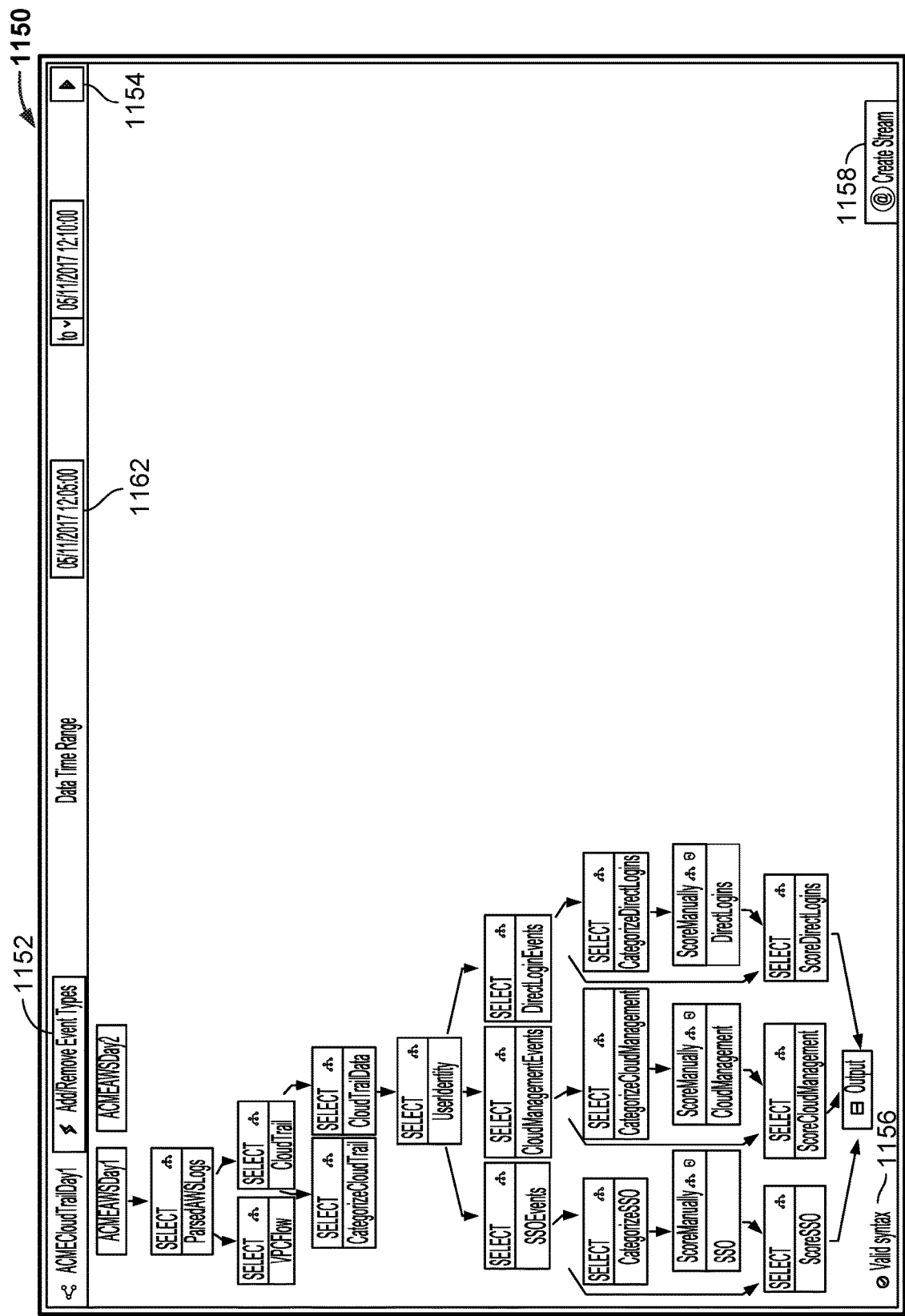
FIG. 11B is an example of a GUI for security intelligence automation.

FIG. 11A is an example of a visual flow for security intelligence automation. The visual flow (also called "graph") may be displayed in a GUI. In some embodiments, GUI 1100 is used to view and manage flows. GUI 1100 may be part of an IDE. FIG. 11B is an example of a GUI including a visual flow.

Returning to FIG. 11A, the visual flow 1100 may be automatically generated from code, e.g., by using a JavaScript graph library. Conversely, a visual flow may be translated to JSON, then translated to executable code. Thus, a user may modify underlying executable code by simply interacting with the visual flow with needing to directly edit the code. A graph may be rendered from code and/or translated to code according processes further described herein, e.g., with respect to FIG. 3.

The graph represents a process for generating output based on input. In the example shown in FIG. 11A, the input is "ACMEAWSDay1." ACMEAWSDay1 may include raw data such as the examples shown in FIG. 10B. The graph includes a plurality of nodes representing various events. The process begins at the top of the graph. In this example, Parsed AWS Logs is determined from ACMEAWSDay1. VPC Flow and Cloud Trail may be derived from the Parsed AWS Logs. For example, AWS Log data may be categorized as IP traffic data belonging to VPC flow or API call data belonging to Cloud Trail. In this example, detailed nodes are shown for Cloud Trail. In other embodiments, VPC flow may have one or more child nodes and corresponding output. In various embodiments, one or more child nodes may be collapsed or hidden for a parent to facilitate user experience by allowing details to be hidden or obscured while working on a different part of the visual flow. This example generates an output threat ranking score based on the Cloud Trail as follows. Cloud trail data may be categorized ("Categorize Cloud Trail") and/or Cloud Trail Data may be analyzed ("Cloud Trail Data").

In this example, the analysis of Cloud Trail Data includes examining User Identity information. User Identity may provide information about SSO Events, Cloud Management Events, and Direct Login Events. For example, a user identity such as username may be provided when login is attempted. SSO Events refers to single sign-on events associated with the user identity. Cloud management events refer to actions associated with cloud management and interaction corresponding to the user identity. Direct login events refer to direct logins by the user such as by entering a username/password combination.

Turning to SSO Events 1102, the SSO may be scored by a combination of an automatically generated SSO score and a manually generated score. In some instances, the automatically generated SSO score is represented by path 1104 which determines an SSO score from SSO events 1102 without receiving a manual score. For example, SSO events may be provided to a machine learning engine to automatically obtain a score. In some instances, the SSO score 1106 is based on a combination of automatic scoring and a manual score 1108. Similarly, cloud management score 1112 may be based on automatic scoring, manual scoring, or a combination thereof. Direct logins score 1114 may be based on automatic scoring, manual scoring, or a combination thereof.

The categorization events ("Categorize SSO," "Categorize Cloud Management," and "Categorize Direct Logins") refer to data analysis of SSO data, cloud management data, and direct logins. For example, the data may be analyzed according to the processes described herein such as FIG. 1 in which data is enriched and segmented.

In this example, the output is a combination of the SSO score 1106, cloud management score 1112, and direct logins score 1114. For example, a threat ranking may be combination of the component scores.

Figure 12:
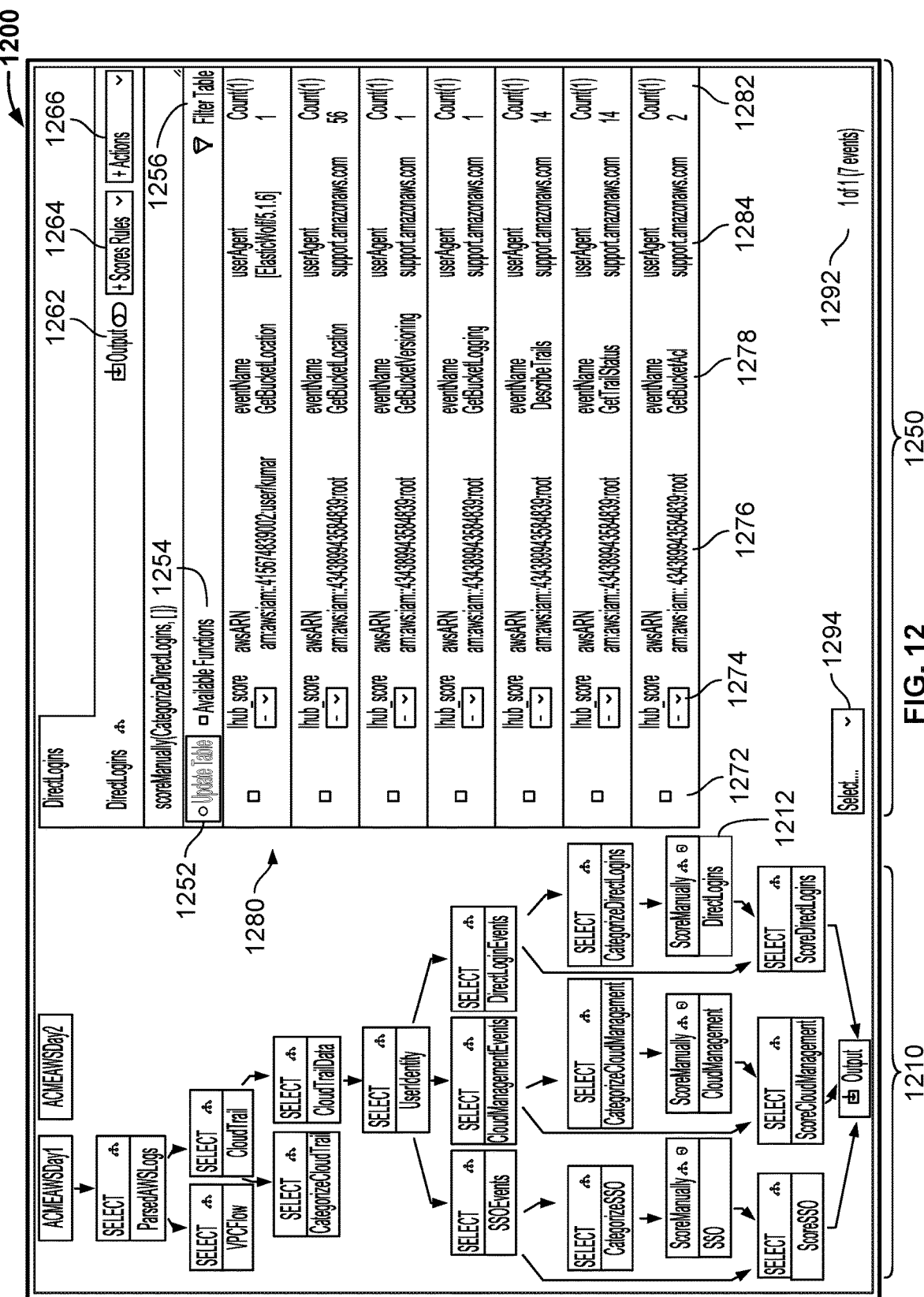
FIG. 12 is an example of a GUI configured to receive a manual score for security intelligence automation.

In various embodiments, nodes of the visual flow can be modified to add or change information. For example, some of the nodes may be selected by choosing the "Select" button for the node. Referring to node 1110, the node displays the represented data 1114 and a selection button 1112 for viewing additional details about the represented data and/or selection of preferences for the data represented by the node. Some of the nodes may be scored manually, for example by choosing the "Score Manually" shaded button for the node. In this example, SSO 1108, Cloud Management 1116, and Direct Logins 1118 may be scored manually. An example of manually scoring Direct Logins is shown in FIG. 12.

FIG. 11B is an example of a GUI for security intelligence automation. In some embodiments, GUI 1150 is used to view and manage flows. GUI 1150 may be part of an IDE. The graph shown in GUI 1150 represents ACMECloudTrailDay1. In various embodiments, selecting "ACMECloudTrailDay1" in GUI 900 of FIG. 9 causes the graph in GUI 1150 to be displayed.

In various embodiments, GUI 1150 displays a time range 1162 corresponding to the data represented in the graph. Here, the date time range is 12:05:00 to 12:10:00 on May 11, 2017. In some embodiments, in response to user selection of a date time range, the graph may be dynamically updated to display data corresponding to the selected date time range.

In some embodiments, event types may be added or removed by selecting button 1102. In various embodiments, event types (e.g., nodes) may be added or removed via button 1152. Event types may be added and/or removed graphically, e.g., by selecting the node to be removed, and underlying code may be automatically updated. This may enhance user experience compared with text-only SIA because a user need not directly edit code to add and/or remove event types. Event types may be added and/or removed as part of a manual scoring process. An example of adding an event via a GUI is further described herein, e.g., with respect to FIG. 21.

In various embodiments, a flow may be executed using on-demand run button 1154 (sometimes called "run button"). When selected by a user, the run button 1154 runs the flow for the data in the indicated time range 1162.

In various embodiments, syntax may be automatically checked in example GUI 1150. For example, if a user inputs simple code expressions in the graph, these expressions may be checked automatically. In various embodiments, progress of processing (e.g., dynamic updates) may be indicated by a status bar such as the one shown in GUI 1150, which is about 75% complete in this example.

In various embodiments, a stream may be created by selecting button 1158. A stream is a flow and a schedule (e.g., daily, every 15 minutes, etc.). Upon creation of a stream, batches of data are generated for the corresponding flow. A batch of data refers to flow data for a time range associated with the batch. Batches can be created for the same flow. For example, a first batch is for Day1, a second batch is for Day2, and a third batch is for Day3. The stream is a flow and a schedule. GUI 1150 shows a graph for a first batch, "ACMEAWSDay1." For simplicity, a graph corresponding to ACMEAWSDay2 is hidden/minimized. A user may add nodes to represent event types via button 1152 to build a graph. As further described herein, e.g., with respect to FIG. 11A, a user need not work directly with code to create a stream. Instead, manipulation of the visual flow automatically updates underlying code.

FIG. 12 is an example of a GUI configured to receive a manual score for security intelligence automation. In some embodiments, GUI 1200 is used to view and edit a flow. GUI 1200 may be part of an IDE.

The example GUI 1200 includes a first portion 1210 and a second portion 1250. A graph may be displayed in the first portion 1210. An example graph is shown in FIG. 11A. FIG. 12 shows an example state of GUI 1200 after "Direct Logins" 1212 is selected. For example, in response to user selection of "Direct Logins," portion 1250 is rendered on GUI 1200 to enable manual entry of one or more scores for direct login. The score assigned to a direct login event may reflect estimate risk, as further described herein.

A table 1280 displaying information related to manually scoring direct logins may be displayed in portion 1250. Here, the table includes a selection column 1272 for selecting a corresponding row, lhub score column 1274 for receiving manual input, name column 1276 for displaying a resource, event name column 1278 for displaying an event, user agent column 1284 for displaying an agent, and count column 1282 for displaying a counter of instances that the event has occurred. The number of columns and type of columns including in table 1280 may vary. As shown, there are seven events. The events may be summarized in GUI 1200 by summary 1292.

In various embodiments, one or more rows may be selected to process the selected rows at substantially the same time. For example, a user may assign the same score to multiple entries by selecting those entries and assigning the scores. In some embodiments, all of the rows may be scored at once. For example selection button 1294 allows rows to be selected in batches. An example of batch processing of rows is further described herein, e.g., with respect to FIG. 15.

The hub score column 1274 displays a field to accept manual input of a score. If a score has already been assigned, the hub score column may display the assigned score. In this example, the hub score may be input via a drop-down menu, which allows selection of a score in a pre-defined range. The resource name column 1276 displays a name of a corresponding resource. In this example, the resource is an Amazon Resource Name (awsARN). The resource name may include information about a user account or client identifier. The event name column 1278 displays an event associated with the entry. The user agent column 1284 displays information about a user agent. For example, the first entry corresponds to an AWS elastic wolf client console, and the other entries correspond to a web portal, support.amazonaws.com. The count column 1282 displays a count corresponding to the associated entry.

In various embodiments, table 1280 may be filtered, e.g., in response to selection of button 1256. For example, those entries with a hub score meeting one or more criterion may be displayed, those entries having a selected user agent may be displayed, etc. In various embodiments, the table is updated by selecting update table button 1252. In various embodiments, the table is updated automatically and dynamically without needing to select update table button 1252. In various embodiments, available functions 1254 may be viewed by selecting the corresponding link. In response, functions permitted to be executed for one or more elements displayed in GUI 1200 may be displayed. Example functions include adding or removing an event type, filtering and scoring an event, and the like.

In various embodiments, one or more menu items may be displayed to assist navigation. Output toggle 1262 allows output to be displayed in real time or not. For example. When output toggle 1262 is on, portion 1210 may be updated automatically. When output toggle 1262 is off, portion 1210 may be updated periodically or in response to user request via 1252 instead of automatically. Score rules button 1264 displays one or more rules corresponding to a current selection, here, "Direct Logins." This may help a user to understand how a score a is generated by showing current rules used to determine the score. For example, the score rules may include a playbook consulted by a human security analyst to assign a manual score. Actions button 1266 displays one or more actions permitted for the current GUI. Example actions include adding or deleting nodes and adding specific types of nodes.

FIG. 13 is an example of a GUI configured to receive a manual score for security intelligence automation. In some embodiments, GUI 1300 is used to view and manage flows. GUI 1300 may be part of an IDE.

FIG. 13 shows a state of GUI 1200 after receiving manual input 1374 of score "7" in the first row of table 1380. For example, a user may select node 1312, causing table 1380 to be displayed. The user may provide feedback by inputting a manual score in the column indicated by "lhub score." As further described herein, a relatively higher score may be assigned by a user when the score is interesting. Here, the relatively high score of "7" (on a scale of 0-10) is assigned. A security analyst may assign this relatively high score for a variety of reasons, which might not necessarily mean that the associated event is a threat. For example, a relatively higher score may be assigned to an action that has not be performed before by a particular user meriting further attention in an alert triaging stage.

Figure 14:
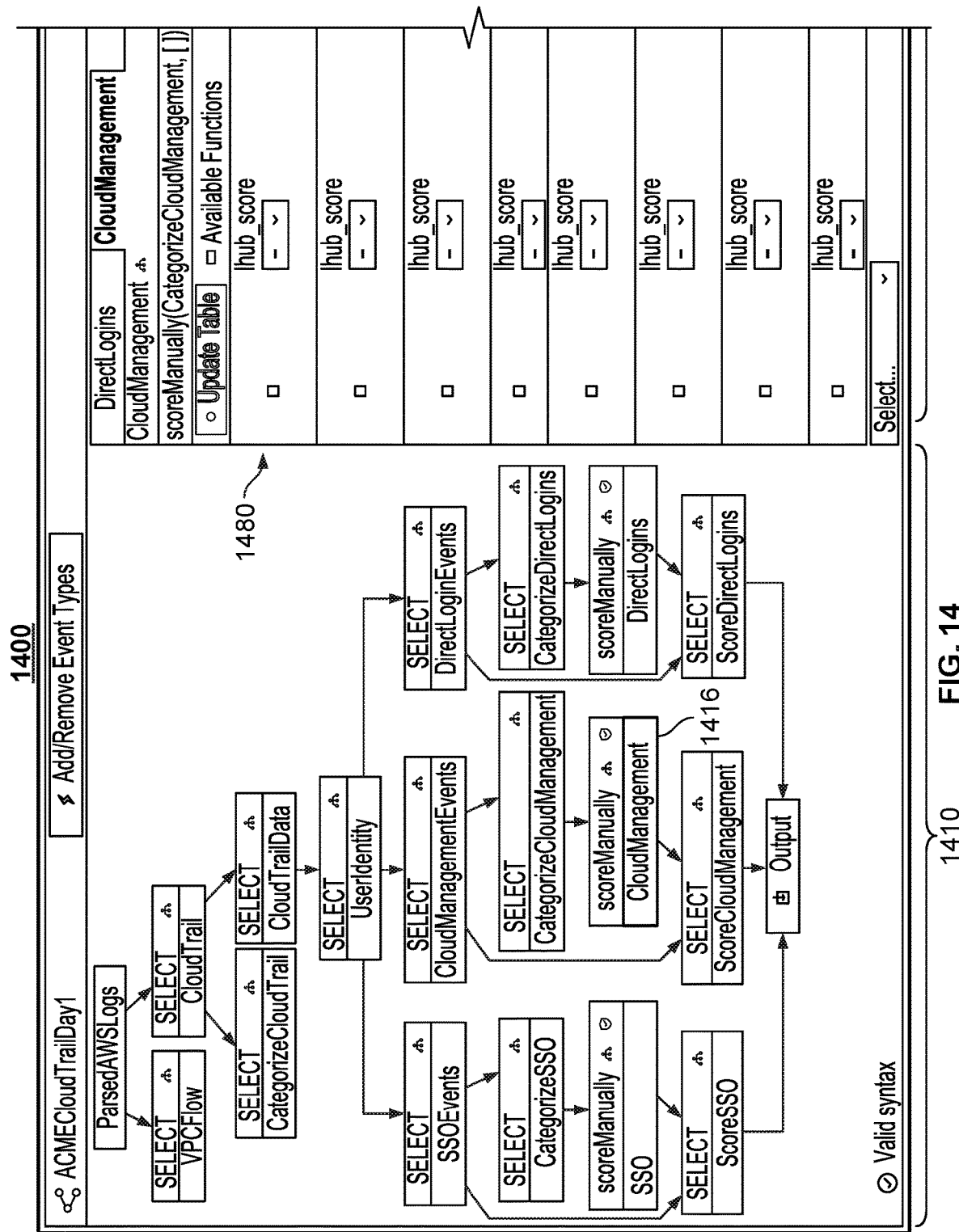
FIG. 14 is an example of a GUI configured to receive a manual score for security intelligence automation.

FIG. 14 is an example of a GUI configured to receive a manual score for security intelligence automation. In some embodiments, GUI 1400 is used to view and manage flows. GUI 1400 may be part of an IDE.

GUI 1400 includes the same components as FIG. 12 unless otherwise described herein. In this example, table 1480 is rendered in response to selection of node 1416. Node 1416 may be selected to manually score cloud management. FIG. 14 shows a state of GUI 1400 prior to manual assignment of scores. Here, table 1480 includes issuer column 1482, event name column 1484, user agent column 1486, and count column 1488.

The issuer column 1482 displays a user name of an issuer. In this example, the issuers for the fourth and eighth rows is "CloudHealthCostManagement," and the issuer for the rest of the rows is "Dome9SecurityManagement." The event column 1484 displays an event corresponding to an entry. For example, events according to "Cloud Management" include increasing a score/ranking if an application is unknown. The user agent column 1486 displays information about a user agent. Here, example user agents include Windows NT® .NET framework and AWS SDK Ruby. The count column 1488 displays a counter of instances that the event occurred.

Figure 15:
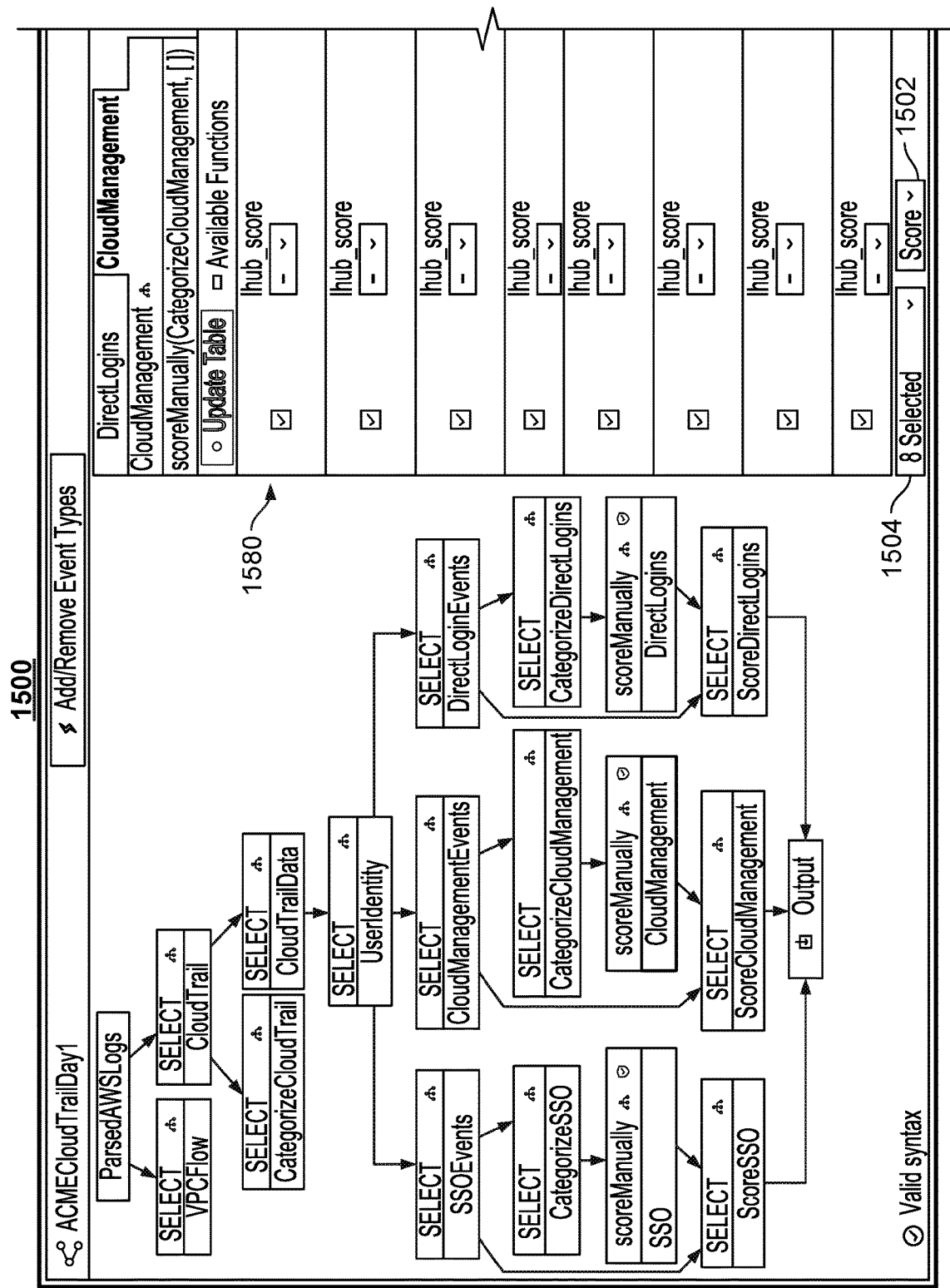
FIG. 15 is an example of a GUI configured to receive a manual score for security intelligence automation.

FIG. 15 is an example of a GUI configured to receive a manual score for security intelligence automation. In some embodiments, GUI 1500 is used to view and manage flows. GUI 1500 may be part of an IDE.

FIG. 15 shows a state of GUI 1500 after receiving manual selection 1504 of all eight events corresponding to the entries of table 1580. GUI 1500 includes the same components as FIG. 12 unless otherwise described herein. This allows batch processing of more than one entry. Here, all of the entries may be assigned the same score. As shown, a score selection menu 1502 is rendered next to the manual selection field 1504 to allow a user to input a score.

Figure 16:
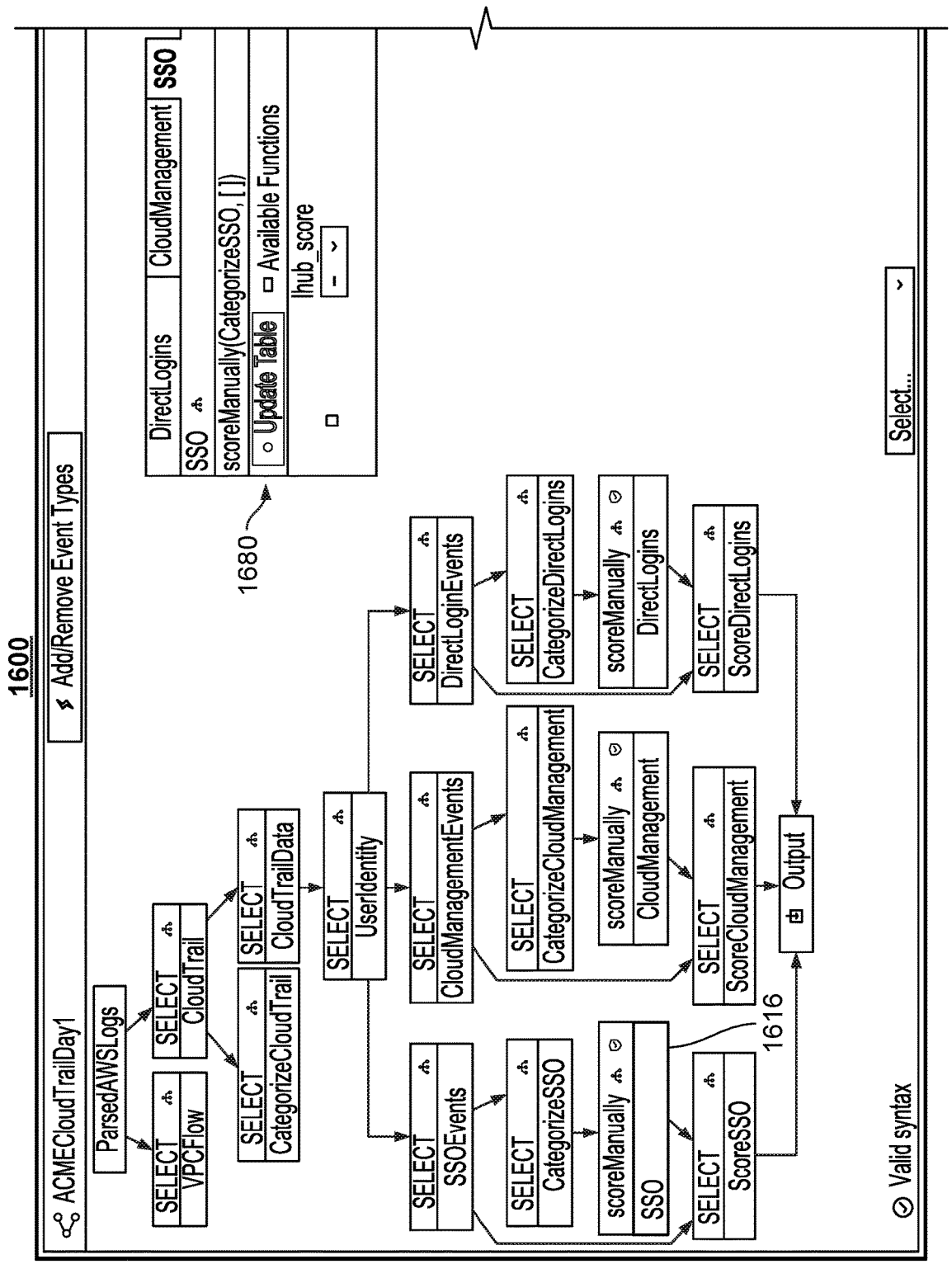
FIG. 16 is an example of a GUI configured to receive a manual score for security intelligence automation.
Figure 16:
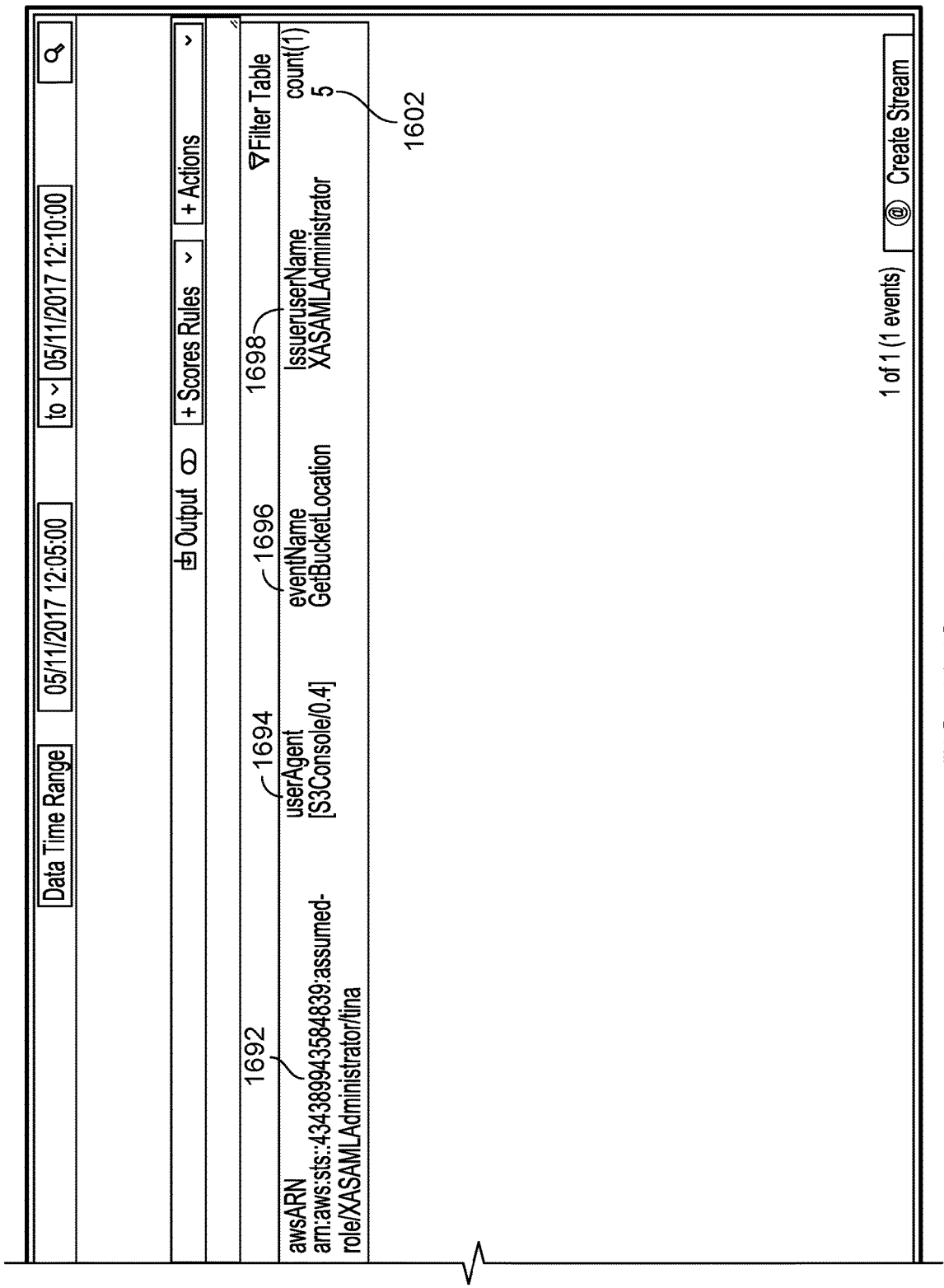

FIG. 16 is an example of a GUI configured to receive a manual score for security intelligence automation. In some embodiments, GUI 1600 is used to view and manage flows. GUI 1600 may be part of an IDE.

GUI 1600 includes the same components as FIG. 12 unless otherwise described herein. In response to selection of SSO manual score node 1616, table 1680 is rendered. The hub score column in table 1680 is configured to accept user input such as manual entry of a score for the associated row. GUI 1600 displays data corresponding to Day1 such as data collected the day after data is collected for GUI 1300 of FIG. 13.

FIG. 17A is an example of a GUI for security intelligence automation displaying raw data with an associated source and host. In some embodiments, GUI 1700 is used to view and manage flows. GUI 1700 may be part of an IDE.

GUI 1700 includes the same components as FIG. 10A unless otherwise described herein. In the example GUI 1700, the first row has a hub score of "7.0." The hub score may be rendered in various colors depending on the value of a score. If a score meets a threshold, the score may be rendered in a particular color. For example, scores below 4 are considered low risk and displayed in green, scores between 5 and 8 are considered medium risk and displayed in orange, and scores above 9 are considered high risk and displayed in red.

FIG. 17B is an example of a GUI for security intelligence automation displaying raw data of a batch. The information shown in GUI 1750 may be generated after a stream has been created and batches automatically created for a flow associated with the stream such as via GUI 1150 of FIG. 11B. In some embodiments, GUI 1750 is used to view batch data collected for a flow. GUI 1750 may be part of an IDE. The example GUI 1750 includes example values of hub scores (e.g., an integer or decimal value), and raw data.

The example GUI 1750 shows raw data for a batch of a flow, "Flow 1." at The associated time period 1704 for this batch is the 30-minute window between 14:45 and 15:15 on May 11, 2017. In various embodiments, the name of the batch ("14:45-15:15 05/11/2017") is automatically generated with the time range. The data displayed here may be collected after the data displayed in FIG. 10B is collected. In some embodiments, event types are static and a fixed amount of data or fixed data set is produced regardless of the time range queries. In some embodiments, event types are dynamic and changes based on the time a query is made. In this example, the event type is static.

In this example, the hub score in the first row is colored orange and the hub scores in the other rows are colored green for reasons such as those reasons described with respect to FIG. 17A. This may facilitate visual identification of particular types of scores. For example, scores corresponding to high risk may be quickly located by scanning the table to find the red scores.

Figure 18:
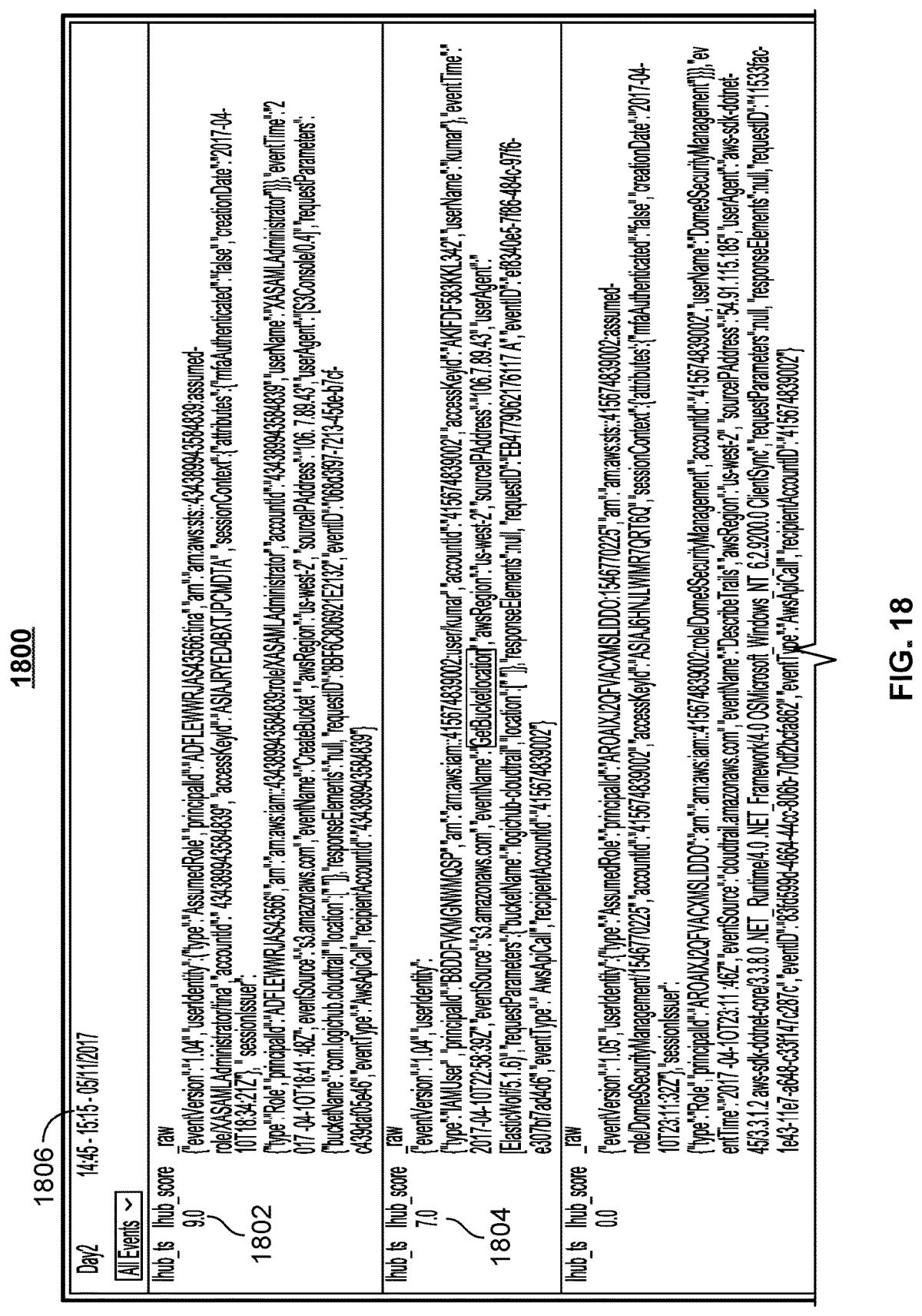

FIG. 18 is an example of a GUI for security intelligence automation displaying raw data with an associated source and host. In some embodiments, GUI 1800 is used to view and manage flows. GUI 1800 may be part of an IDE. The example GUI 1800 includes example values of hub scores (e.g., an integer or decimal value), and raw data.

The example GUI 1800 shows raw data for Day2 at an associated time period 1806. The data displayed here may be collected after the data displayed in FIG. 17B is collected. In this example, raw data is displayed for the half-hour time period between 14:45 to 15:15 on May 11, 2017.

In this example, The hub score in the first row is colored red, the hub score in the second row is colored orange, and the hub scores in the other rows are colored green for reasons such as those reasons described with respect to FIG. 17A. This may facilitate visual identification of particular types of scores. For example, scores corresponding to high risk may be quickly located by scanning the table to find the red scores.

Figure 19:
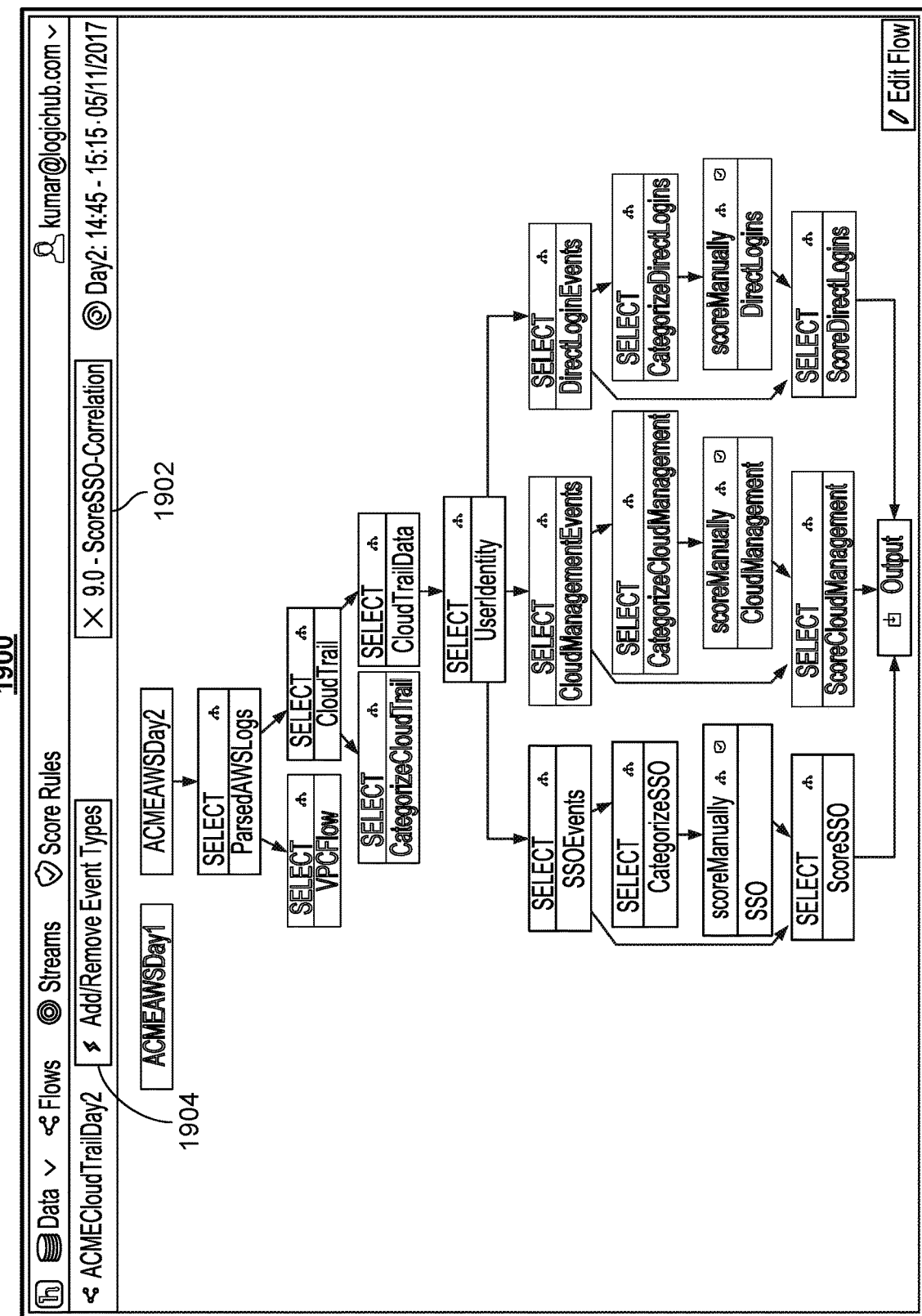
FIG. 19 is an example of a GUI for security intelligence automation.

FIG. 19 is an example of a GUI for security intelligence automation. In some embodiments, GUI 1900 is used to view and manage flows. GUI 1900 may be part of an IDE. The graph shown in GUI 1900 represents ACMECloudTrail-Day2. In various embodiments, selecting "ACMECloudTrailDay2" in GUI 900 of FIG. 9 causes GUI 1900 to be displayed. The example GUI 1900 includes the same components as GUI 1150 unless otherwise described herein. Example GUI 1900 includes a button 1904 to add or remove events which functions like button 1152 of FIG. 11.

In various embodiments, the GUI 1900 includes an option 1902 to display an explanation/trace for a score. The trace, which is a path taken to arrive at a score, provides an explanation of the value of a score by showing the path taken to reach the score. The explanation/trace of the score may be visually represented by a path in a graph in which nodes along the path are highlighted to indicate the reasoning by which a score is determined. In the example GUI 1900, the option to display an explanation for the SSO score is displayed by selecting button 1902. In response to this user request, the graph is rendered as shown with the path connecting nodes "ParsedAWSLogs," "CloudTrail," "CloudTrailData," "UserIdentity," "SSOEvents," "CategorizeSSO," "ScoreManually SSO," and "ScoreSSO." This allows a user to quickly identify the factor(s) considered for (as represented by the path to) the SSO score. For example, here the highlighted path indicates that the SSO score includes a manual component, is derived based at least in part on user identity, cloud trail data, and ultimately from AWS logs.

Figure 20:
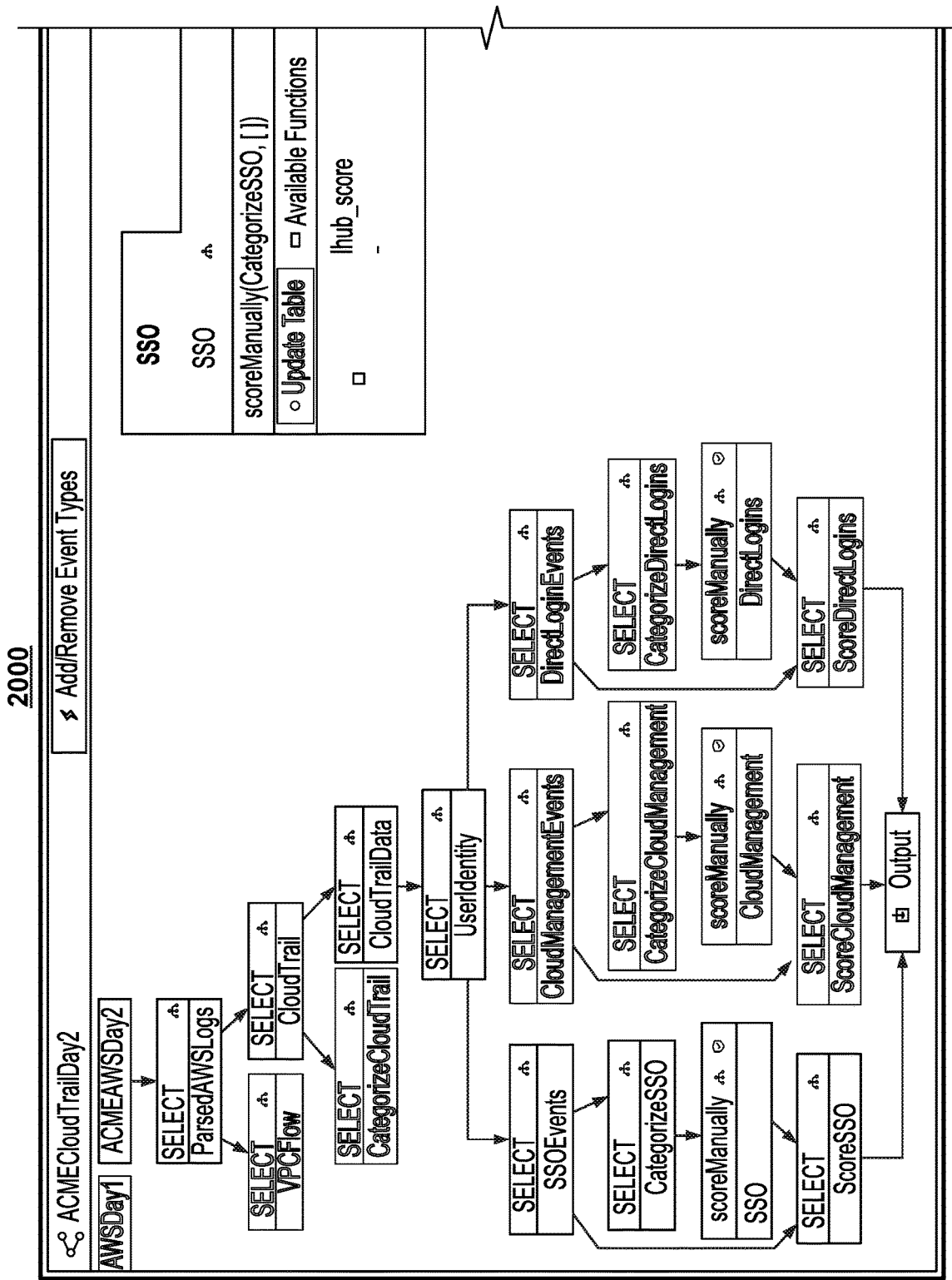
FIG. 20 is an example of a GUI configured to receive a manual score for security intelligence automation.
Figure 20:
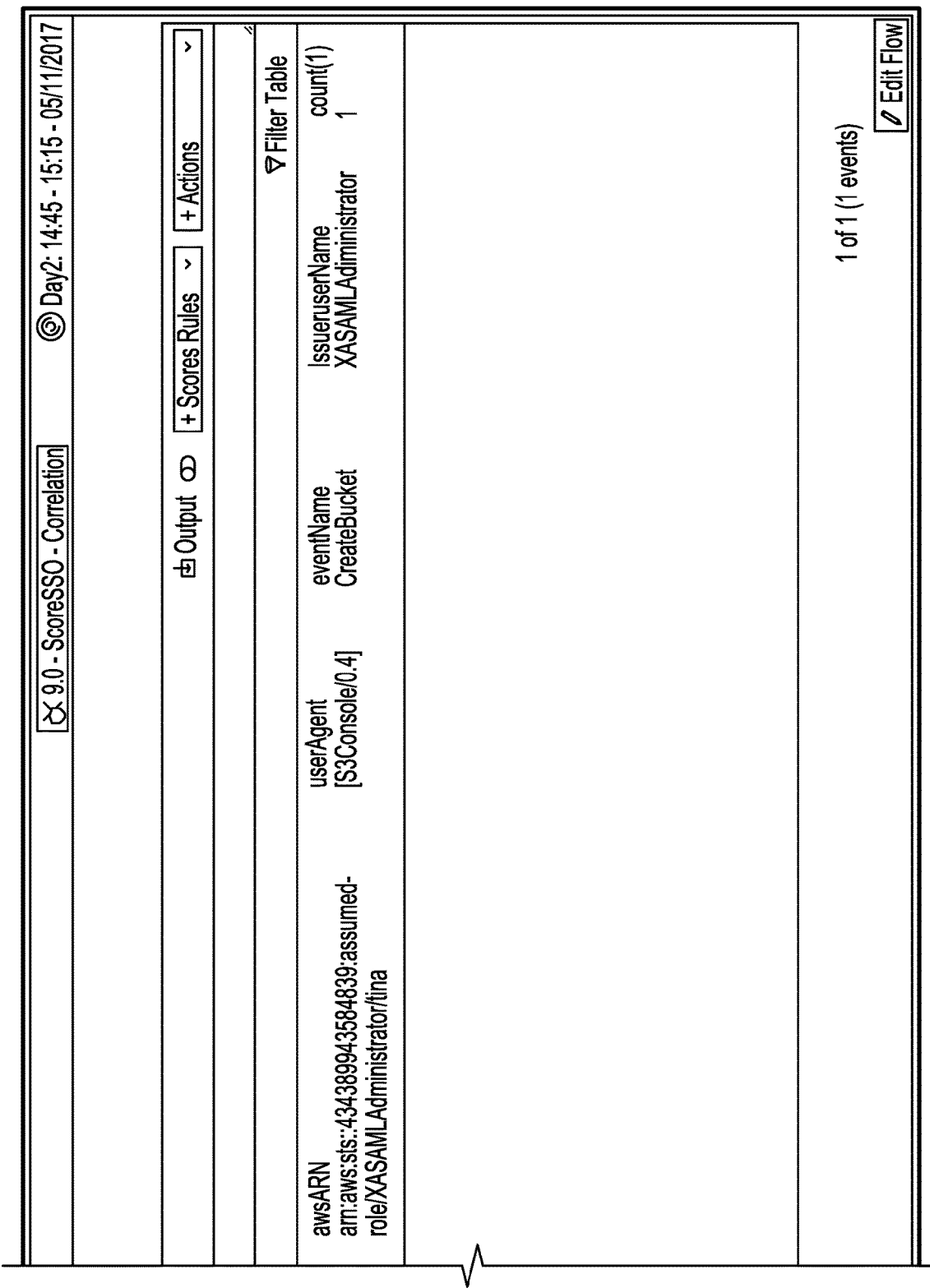

FIG. 20 is an example of a GUI configured to receive a manual score for security intelligence automation. In some embodiments, GUI 2000 is used to view and manage flows. GUI 2000 may be part of an IDE.

GUI 2000 includes the same components as FIG. 13 unless otherwise described herein. In response to selection of a SSO manual score node, a table is rendered. The hub score column is configured to accept user input such as manual entry of a score for the associated row. GUI 2000 displays data corresponding to Day2 such as data collected two days after data is collected for GUI 1300 of FIG. 13.

Figure 21:
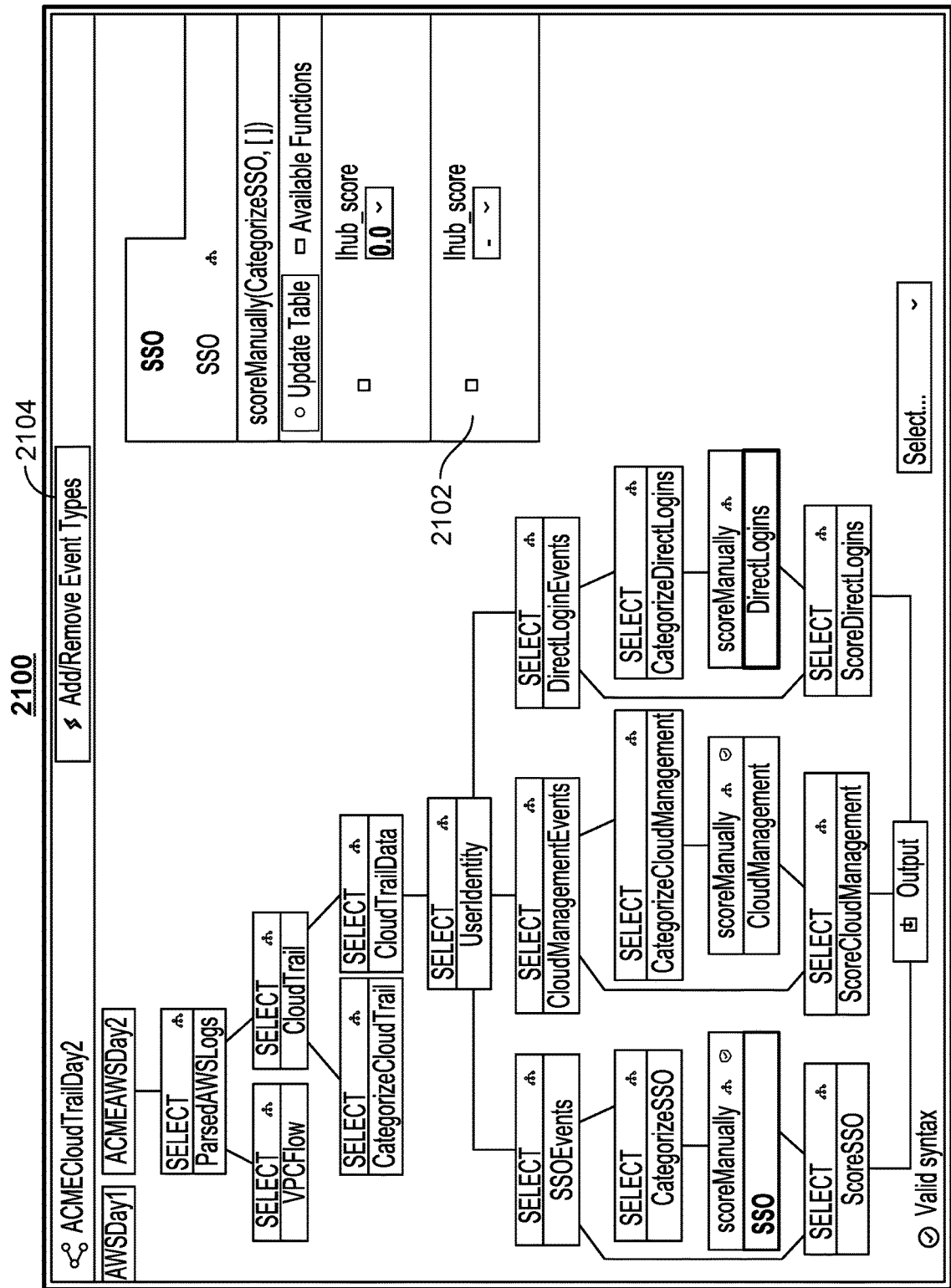
FIG. 21 is an example of a GUI configured to receive a manual score for security intelligence automation.

FIG. 21 is an example of a GUI configured to receive a manual score for security intelligence automation. In some embodiments, GUI 2100 is used to view and manage flows. GUI 2100 may be part of an IDE.

GUI 2100 includes the same components as FIG. 20 unless otherwise described herein. FIG. 21 shows an example state of GUI 2100 after Add/Remove Event Type button 2104 has been selected to add an event. In response to a user request to add an event, row 2102 is added to the table. The addition of row 2102 allows additional collected data to be considered in the determination of the manual score. Here, user input event name "CreateBucket," and the rest of the columns corresponding to this row is automatically populated. Some types of events include additional fields configured to receive user input.

Although not shown, a user may remove an event type using button 2104. For example, a user may select the check box in the left-most column of the table, select the button 2104 and the corresponding row will be removed from the table and removed as a factor in the calculation of the manual score.

Figure 22:
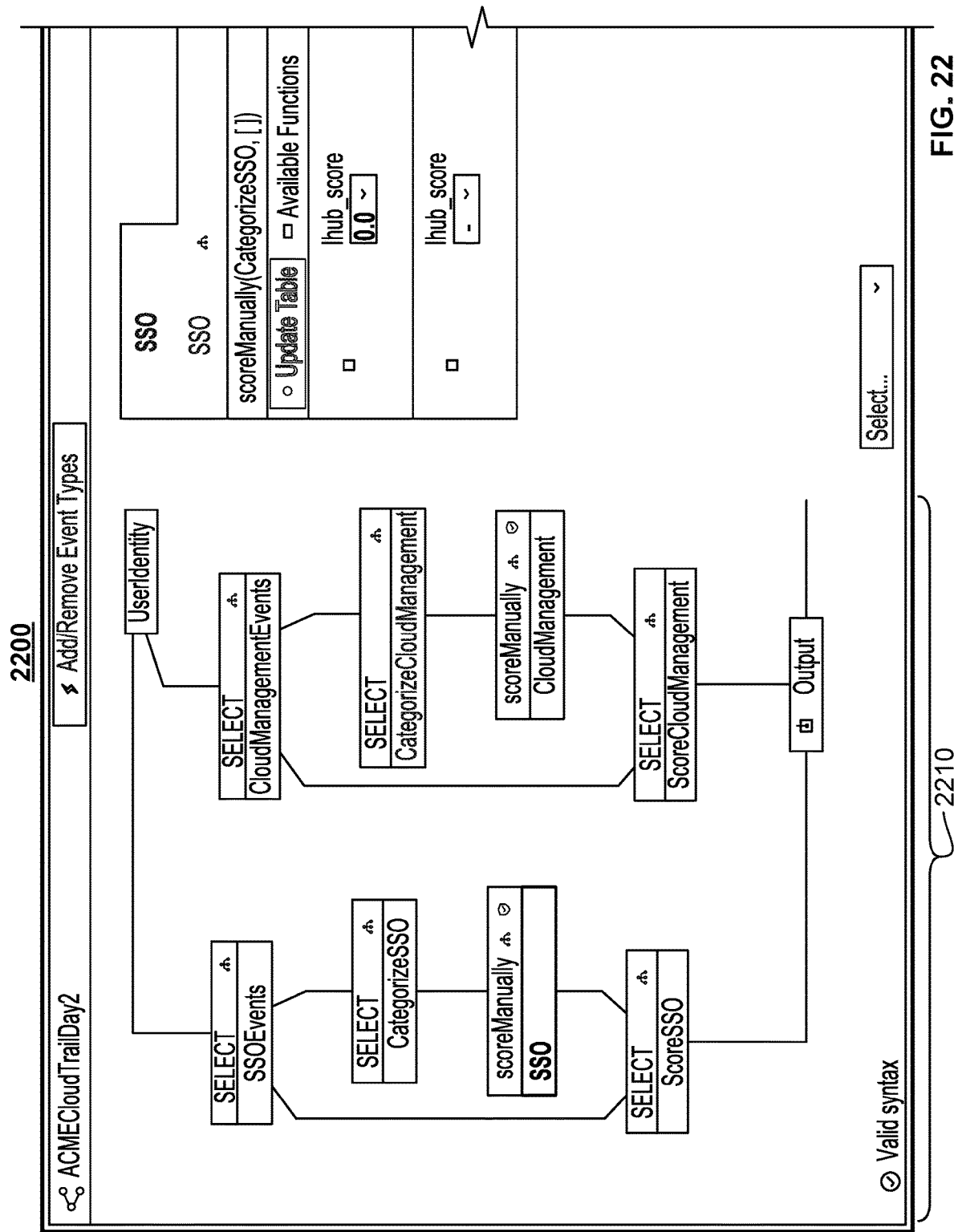
FIG. 22 is an example of a GUI configured to receive a manual score for security intelligence automation.

FIG. 22 is an example of a GUI configured to receive a manual score for security intelligence automation. In some embodiments, GUI 2200 is used to view and manage flows. GUI 2200 may be part of an IDE.

GUI 2200 includes the same components as FIG. 21 unless otherwise described herein. GUI 2200 shows a zoomed in view of graph portion 2210. This enhances user experience by allowing a user to drill down in a desired portion of a visual flow graph. For example, if a graph is complex and the text is small, a user may zoom in to better view the relevant portion of the graph. Here, the user is manually scoring SSO. In some embodiments, in response to manual scoring of a particular node, the graph portion may automatically be rendered in a zoomed view substantially centered on that node. In some embodiments, the graph portion may be rendered in a zoomed view in response to a user command such as double tapping a touch screen and the like.

Figure 23:
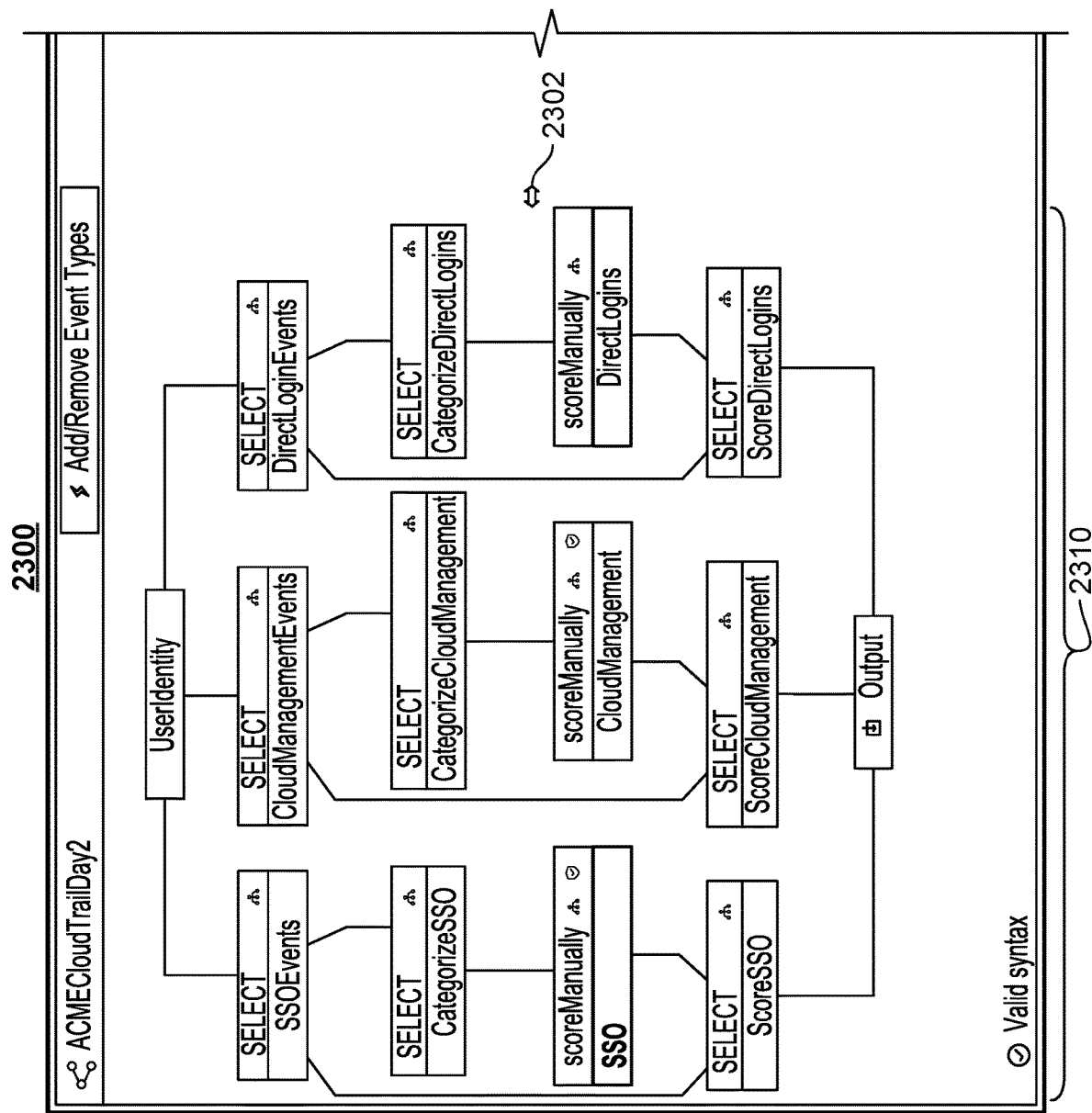
FIG. 23 is an example of a GUI configured to receive a manual score for security intelligence automation.
Figure 23:
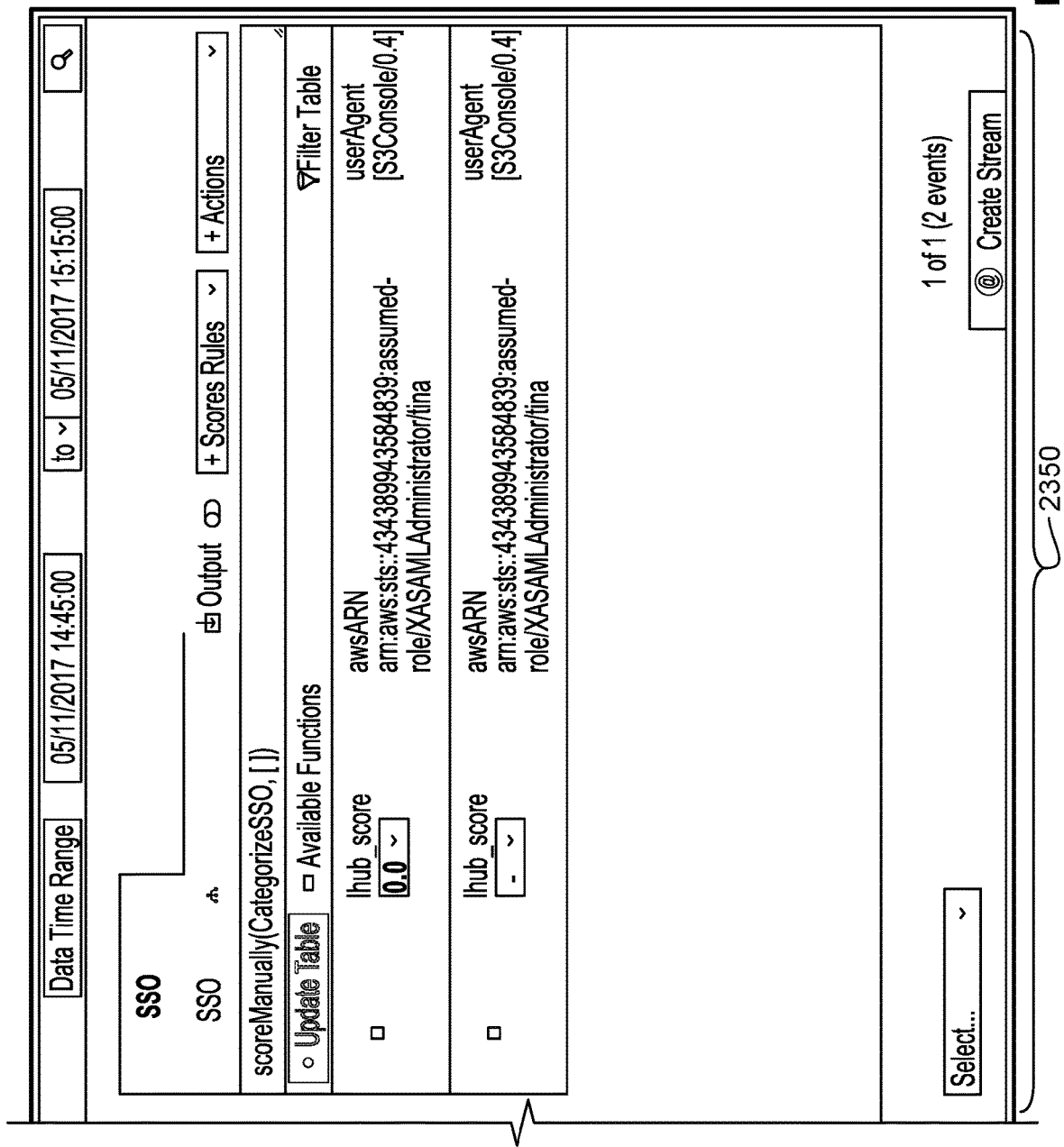

FIG. 23 is an example of a GUI configured to receive a manual score for security intelligence automation. In some embodiments, GUI 2300 is used to view and manage flows. GUI 2300 may be part of an IDE.

The example GUI 2300 includes the same components as GUI 2100 of FIG. 21 unless otherwise described herein. GUI 2300 shows a zoomed in view of graph portion 2310. Here, the division of the graph portion 2310 and table portion 2350 may be adjusted. For example, divider 2302 (which may be a visible or invisible divider) may be dragged to a desired location. In this example, the graph portion 2310 is rendered using approximately ⅔ of the space and table portion 2350 is rendered using approximately ⅓ of the space. This proportion may be adjusted using divider 2302 to facilitate viewing of desired details in the graph portion 2310 and/or table portion 2350.

The systems and processes described herein may have several advantages over conventional threat detection and alert triaging techniques. For example, an unknown threat may be detected even if a rule has not been written to detecting such as threat. False negatives may be reduced. False positives may be reduced. The mean time to identify (MTTI), e.g., the average time to identify a threat, may be reduced. This allows resources (both computational and human) to be freed up to focus on critical alerts. In addition, tribal knowledge may be preserved as the SIA platform learns and improves over time. The systems and processes described herein are compatible with existing security frameworks and can be built on top of those frameworks to improve cybersecurity.

The SIA platform improves threat detection in various ways. In one aspect, false negatives may be avoided by monitoring relevant aspects of a given enterprise network for threat detection. In various embodiments, a tool that reduces the time and/or cost to automate analysis of potential threats is provided. For example, the tool may automate threat detection to complete on the order of a few hours rather than the order of a few weeks that conventional techniques typically require.

In various embodiments, a visual flow interface such as those shown in FIGS. 11A-16 and 19-23 has a drag and drop facility to process automation flow. In one aspect, the drag and drop facility improves the technical field of computer programming (computer-implemented threat detection) by being making threat detection faster and more efficient. For example, a user may quickly create a flow by directly interacting with graphical elements. The resulting graphical arrangement in the visual flow interface may be compiled and a flow automatically generated.

As described above, one or more of the example GUIs may be provided in an IDE. The IDE may have several modes of operation including, for example, scheduled mode, continuous mode, and on-demand mode. In the schedule mode of operation, analysis of event data takes place on a scheduled basis such as periodically. In the continuous mode of operation, analysis of event data takes place on a continuous basis, terminating when a criteria is met or at a pre-defined time. In the on-demand mode of operation, analysis of event data happens in response to a trigger such as the invocation by an API call.

Figure 24:
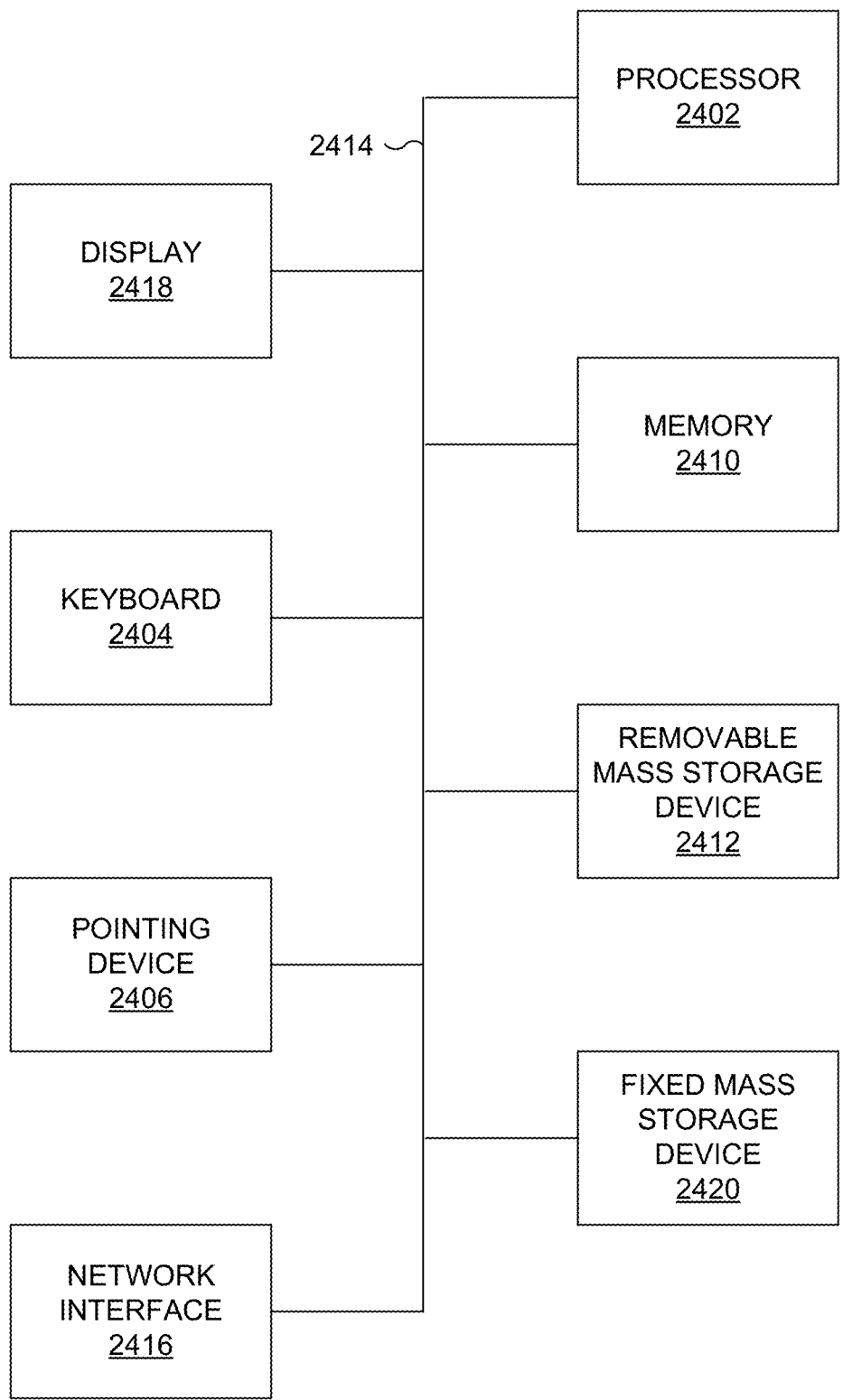
FIG. 24 is a functional diagram illustrating a programmed computer system for security intelligence automation in accordance with some embodiments.

FIG. 24 is a functional diagram illustrating a programmed computer system for security intelligence automation in accordance with some embodiments. As will be apparent, other computer system architectures and configurations can be used to perform the described security intelligence automation technique. Computer system 2400, which includes various subsystems as described below, includes at least one microprocessor subsystem (also referred to as a processor or a central processing unit (CPU) 2402). For example, processor 2402 can be implemented by a single-chip processor or by multiple processors. In some embodiments, processor 2402 is a general purpose digital processor that controls the operation of the computer system 2400. In some embodiments, processor 2402 also includes one or more coprocessors or special purpose processors (e.g., a graphics processor, a network processor, etc.). Using instructions retrieved from memory 2410, processor 2402 controls the reception and manipulation of input data received on an input device (e.g., image processing device 2406, I/O device interface 2404), and the output and display of data on output devices (e.g., display 2418).

Processor 2402 is coupled bi-directionally with memory 2410, which can include, for example, one or more random access memories (RAM) and/or one or more read-only memories (ROM). As is well known in the art, memory 2410 can be used as a general storage area, a temporary (e.g., scratch pad) memory, and/or a cache memory. Memory 2410 can also be used to store input data and processed data, as well as to store programming instructions and data, in the form of data objects and text objects, in addition to other data and instructions for processes operating on processor 2402. Also as is well known in the art, memory 2410 typically includes basic operating instructions, program code, data, and objects used by the processor 2402 to perform its functions (e.g., programmed instructions). For example, memory 2410 can include any suitable computer readable storage media described below, depending on whether, for example, data access needs to be bi-directional or uni-directional. For example, processor 2402 can also directly and very rapidly retrieve and store frequently needed data in a cache memory included in memory 2410.

A removable mass storage device 2412 provides additional data storage capacity for the computer system 2400, and is optionally coupled either bi-directionally (read/write) or uni-directionally (read only) to processor 2402. A fixed mass storage 2420 can also, for example, provide additional data storage capacity. For example, storage devices 2412 and/or 2420 can include computer readable media such as magnetic tape, flash memory, PC-CARDS, portable mass storage devices such as hard drives (e.g., magnetic, optical, or solid state drives), holographic storage devices, and other storage devices. Mass storages 2412 and/or 2420 generally store additional programming instructions, data, and the like that typically are not in active use by the processor 2402. It will be appreciated that the information retained within mass storages 2412 and 2420 can be incorporated, if needed, in standard fashion as part of memory 2410 (e.g., RAM) as virtual memory.

In addition to providing processor 2402 access to storage subsystems, bus 2414 can be used to provide access to other subsystems and devices as well. As shown, these can include a display 2418, a network interface 2416, an input/output (I/O) device interface 2404, an image processing device 2406, as well as other subsystems and devices. For example, image processing device 2406 can include a camera, a scanner, etc.; I/O device interface 2404 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 2400. Multiple I/O device interfaces can be used in conjunction with computer system 2400. The I/O device interface can include general and customized interfaces that allow the processor 2402 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 2416 allows processor 2402 to be coupled to another computer, computer network, or telecommunications network using a network connection as shown. For example, through the network interface 2416, the processor 2402 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 2402 can be used to connect the computer system 2400 to an external network and transfer data according to standard protocols. For example, various process embodiments disclosed herein can be executed on processor 2402, or can be performed across a network such as the Internet, intranet networks, or local area networks, in conjunction with a remote processor that shares a portion of the processing. Additional mass storage devices (not shown) can also be connected to processor 2402 through network interface 2416.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 2404 and display 2418 share the touch sensitive screen component, which both detects user inputs and displays outputs to the user). In addition, bus 2414 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
 a processor configured to:
   determine a threat ranking based on at least one factor;
   build a graphical representation of the at least one factor used to determine the threat ranking, wherein the graphical representation includes at least one visual flow having nodes joined by paths and a node represents a factor used to determine the threat ranking;
   provide a graphical user interface for the at least one visual flow for the threat ranking;
   render, in the graphical user interface, a visual flow interface for at least one of generating and configuring the at least one visual flow; and
   provide, via the visual flow interface, a drag and drop ranking automation flow including by:
     receiving a user request to at least one of: add, remove, move, or update a node in the at least one visual flow to change a relationship between nodes in the at least one visual flow;
     in response to the user request, translating the at least one visual flow to executable code;
     executing the code;

attaching a result of the execution of the code; and
updating the at least one visual flow including by changing at least one node to reflect the result of the execution of the code; and
a memory coupled to the processor and configured to provide the processor with instructions.

2. The system of claim 1, wherein the processor is further configured to detect a threat and determine a response to the threat based at least in part on the threat ranking.

3. The system of claim 1, wherein at least one node in the at least one visual flow has an associated table of event data.

4. The system of claim 1, wherein at least one node in the at least one visual flow has an associated domain-specific scoring rule.

5. The system of claim 1, wherein each of the nodes is at least one of: an event type node, an analysis node, a task node, and a scoring node.

6. The system of claim 1, wherein the processor is further configured to at least one of: enrich event data and score event data in response to a transformation made by a user of a node of the at least one visual flow.

7. The system of claim 1, wherein the processor is further configured to automatically run a script on event data and capture output of the script in a table in response to user manipulation of a node of the at least one visual flow.

8. The system of claim 1, wherein the processor is further configured to:
determine the threat ranking based at least in part on event data received from a data stream;
in response to receiving an updated scoring input, update the threat ranking; and
display the threat ranking in the graphical user interface.

9. The system of claim 1, wherein the processor is further configured to:
receive input about the threat ranking via the visual flow interface; and
update a machine learning model based on the received input, wherein the machine learning model is configured to generate the threat ranking.

10. The system of claim 1, wherein the processor is further configured to:
determine at least one score corresponding to the threat ranking based at least in part on a score associated with at least one node in the at least one visual flow; and
render, in the graphical user interface, the at least one score and a corresponding explanation for the score.

11. The system of claim 10, wherein the processor is further configured to, responsive to a determination that the at least one score meets a threshold, render the at least one score in a visually differentiated manner.

12. The system of claim 1, wherein the processor is further configured to render, in the graphical user interface, a correlation for a score.

13. The system of claim 12, wherein the correlation includes highlighting a path in the visual flow interface.

14. The system of claim 1, wherein
the result of the execution of the code is output in a tabular format.

15. The system of claim 1, wherein the translation of the at least one visual flow to executable code includes executing the at least one visual flow by a cluster computing framework.

16. The system of claim 1, wherein the execution the at least one visual flow by a cluster computing framework is performed in an order defined by a flow scheduler.

17. The system of claim 1, wherein the graphical user interface is provided in an integrated development environment and the integrated development environment includes a first portion displaying the visual flow interface and a second portion displaying corresponding scoring fields.

18. The system of claim 17, wherein the processor is further configured to dynamically update the visual flow interface in response to input received at the second portion.

19. The system of claim 1, wherein attaching a result of the execution of the code includes at least one of updating a node, moving a node, adding a node, and removing a node in the at least one visual flow.

20. The system of claim 1, wherein:
the processor is further configured to determine a list of a pre-defined number of events ordered by priority including by:
using event data received from a data stream;
scoring the event data along a plurality of dimensions associated with a priority for review;
determining the list of the pre-defined number of events based at least in part on the scored event data; and
the at least one visual flow in the graphical representation is associated with at least one event on the determined list.

21. A method comprising:
determining a threat ranking based on at least one factor;
building a graphical representation of the at least one factor used to determine the threat ranking, wherein the graphical representation includes at least one visual flow having nodes joined by paths and a node represents a factor used to determine the threat ranking;
providing a graphical user interface for the at least one visual flow for the threat ranking;
rendering, in the graphical user interface, a visual flow interface for at least one of generating and configuring the at least one visual flow; and
providing, via the visual flow interface, a drag and drop process ranking automation flow including by:
receiving a user request to at least one of: add, remove, move, or update a node in the at least one visual flow to change a relationship between nodes in the at least one visual flow;
in response to the user request, translating the at least one visual flow to executable code;
executing the code;
attaching a result of the execution of the code; and
updating the at least one visual flow including by changing at least one node to reflect the result of the execution of the code.

22. A computer program product embodied in a non-transitory computer readable storage medium and comprising computer instructions for:
determining a threat ranking based on at least one factor;
building a graphical representation of the at least one factor used to determine the threat ranking, wherein the graphical representation includes at least one visual flow having nodes joined by paths and a node represents a factor used to determine the threat ranking;
providing a graphical user interface for the at least one visual flow for the threat ranking;
rendering, in the graphical user interface, a visual flow interface for at least one of generating and configuring the at least one visual flow; and
providing, via the visual flow interface, a drag and drop process ranking automation flow including by:
receiving a user request to at least one of: add, remove, move, or update a node in the at least one visual flow to change a relationship between nodes in the at least one visual flow;

in response to the user request, translating the at least one visual flow to executable code;
executing the code;
attaching a result of the execution of the code; and
updating the at least one visual flow including by changing at least one node to reflect the result of the execution of the code.

\* \* \* \* \*